US012800878B2

(12) United States Patent
Kajiyama et al.

(10) Patent No.: US 12,800,878 B2
(45) Date of Patent: Nov. 17, 2026

(54) OPTICAL SYSTEM AND IMAGING APPARATUS HAVING THE SAME

(71) Applicant: CANON KABUSHIKI KAISHA, Tokyo (JP)

(72) Inventors: Kazuhiko Kajiyama, Tochigi (JP); Makoto Takahashi, Tochigi (JP); Naoto Doujou, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 18/978,851

(22) Filed: Dec. 12, 2024

(65) Prior Publication Data

US 2025/0138281 A1 May 1, 2025

Related U.S. Application Data

(63) Continuation of application No. PCT/JP2023/021534, filed on Jun. 9, 2023.

(30) Foreign Application Priority Data

Jun. 15, 2022 (JP) ................................ 2022-096787
Oct. 19, 2022 (JP) ................................ 2022-167466

(51) Int. Cl.
*G02B 13/00* (2006.01)
*G02B 9/64* (2006.01)

(52) U.S. Cl.
CPC .................................... *G02B 9/64* (2013.01)

(58) Field of Classification Search
CPC .. G02B 15/00-28; G02B 13/02; G02B 13/04; G02B 9/00-64; G02B 13/002-0045; G02B 13/18; G02B 3/04
USPC ................. 359/676-695, 745-795, 708-718
See application file for complete search history.

(56) References Cited

U.S. PATENT DOCUMENTS

2007/0229967 A1 10/2007 Nagahara
2011/0090574 A1 4/2011 Harada
2020/0142158 A1 5/2020 Yao
2022/0214523 A1 * 7/2022 Lai ......................... G02B 13/06
2024/0361574 A1 * 10/2024 Chang .................. G02B 13/003

FOREIGN PATENT DOCUMENTS

JP 2007271669 A 10/2007
JP 2011059290 A 3/2011
JP 2016045224 A 4/2016
(Continued)

*Primary Examiner* — Henry Duong
(74) *Attorney, Agent, or Firm* — Canon U.S.A., Inc. IP Division

(57) ABSTRACT

An optical system includes a front group having positive refractive power, an aperture diaphragm, and a rear group having positive refractive power, which are disposed from an object side to an image side in this order, wherein the front group includes a first lens having negative refractive power, a second lens having negative refractive power, a third lens, and a fourth lens having positive refractive power, which are disposed from the object side to the image side in this order, wherein the rear group includes a cemented lens and a positive lens disposed closest to the image side, wherein an object side surface of the second lens is an aspheric surface, and wherein a predetermined conditional expression is satisfied.

20 Claims, 12 Drawing Sheets

(56) References Cited

FOREIGN PATENT DOCUMENTS

| | | | |
|---|---|---|---|
| JP | 2017015941 | A | 1/2017 |
| JP | 2017015967 | A | 1/2017 |
| JP | 2018522266 | A | 8/2018 |
| WO | 2016024412 | A1 | 2/2016 |

* cited by examiner

OPTICAL SYSTEM AND IMAGING APPARATUS HAVING THE SAME

CROSS-REFERENCE TO RELATED APPLICATIONS

This application is a Continuation of International Patent Application No. PCT/JP2023/021534, filed Jun. 9, 2023, which claims the benefit of Japanese Patent Applications No. 2022-096787, filed Jun. 15, 2022, and No. 2022-167466, filed Oct. 19, 2022, all of which are hereby incorporated by reference herein in their entirety.

BACKGROUND OF THE INVENTION

Field of the Invention

The present invention relates to an optical system and is appropriate for imaging apparatuses including digital still cameras, digital video cameras, on-vehicle cameras, portable phone cameras, monitoring cameras, wearable cameras, and medical application cameras.

Background Art

An optical system that is used for imaging apparatuses, such as on-vehicle cameras, is demanded to have a wide angle of view. Patent Literatures (PTLs) 1 and 2 discuss optical systems that have a wide angle of view, and consist of seven different lenses including a first lens having negative refractive power, a second lens having negative refractive power, a third lens having negative refractive power, and a fourth lens having positive refractive power, which are disposed from the object side to the image side in this order.

CITATION LIST

Patent Literature

PTL 1: Japanese Patent Laid-Open No. 2018-522266

PTL 2: United States Patent Application Publication No. 2020/0142158

The optical systems disclosed in PTLs 1 and 2 still have difficulty in reducing the diameters of the first lens disposed closest to the object side and the second lens and reducing the length of the entire system.

SUMMARY OF THE INVENTION

The present invention is directed to providing a small-sized optical system with a wide angle of view and an imaging apparatus having the small-sized optical system with the wide angle of view.

According to an aspect of the present invention, an optical system comprising a front group having positive refractive power, an aperture diaphragm, and a rear group having positive refractive power, which are disposed from an object side to an image side in this order, wherein the front group includes a first lens having negative refractive power, a second lens having negative refractive power, a third lens, and a fourth lens having positive refractive power, which are disposed from the object side to the image side in this order, wherein the rear group includes a cemented lens and a positive lens disposed closest to the image side, wherein an object side surface of the second lens is an aspheric surface having an inflection point in a cross-section including an optical axis, wherein a chart representing a curvature of the aspheric surface with respect to radial positions in the cross-section including the optical axis includes a first extremal value and a second extremal value, and wherein a following conditional expression is satisfied:

$$f1/d12 \le -8.50$$

where f1 is a focal distance of the first lens, and d12 is a distance between the first lens and the second lens on the optical axis.

According to another aspect of the present invention, an optical system comprising a front group having positive refractive power, an aperture diaphragm, and a rear group having positive refractive power, which are disposed from an object side to an image side in this order, wherein the front group includes a first lens having negative refractive power, a second lens having negative refractive power, a third lens, and a fourth lens having positive refractive power, which are disposed from the object side to the image side in this order, wherein the rear group includes a cemented lens and a positive lens disposed closest to the image side, wherein an object side surface of the second lens is an aspheric surface having an inflection point in a cross-section including the optical axis, wherein a chart representing a curvature of the aspheric surface with respect to radial positions in the cross-section including the optical axis includes a first extremal value and a second extremal value, and wherein a following conditional expression is satisfied:

$$2.4 \le f23/fa1 \le 16.0$$

where f23 is a combined focal distance of the second lens and the third lens, and fa1 is a focal distance of an air lens between the second lens and the third lens.

Further features of the present invention will become apparent from the following description of exemplary embodiments with reference to the attached drawings.

DESCRIPTION OF THE EMBODIMENTS

Figure 1:
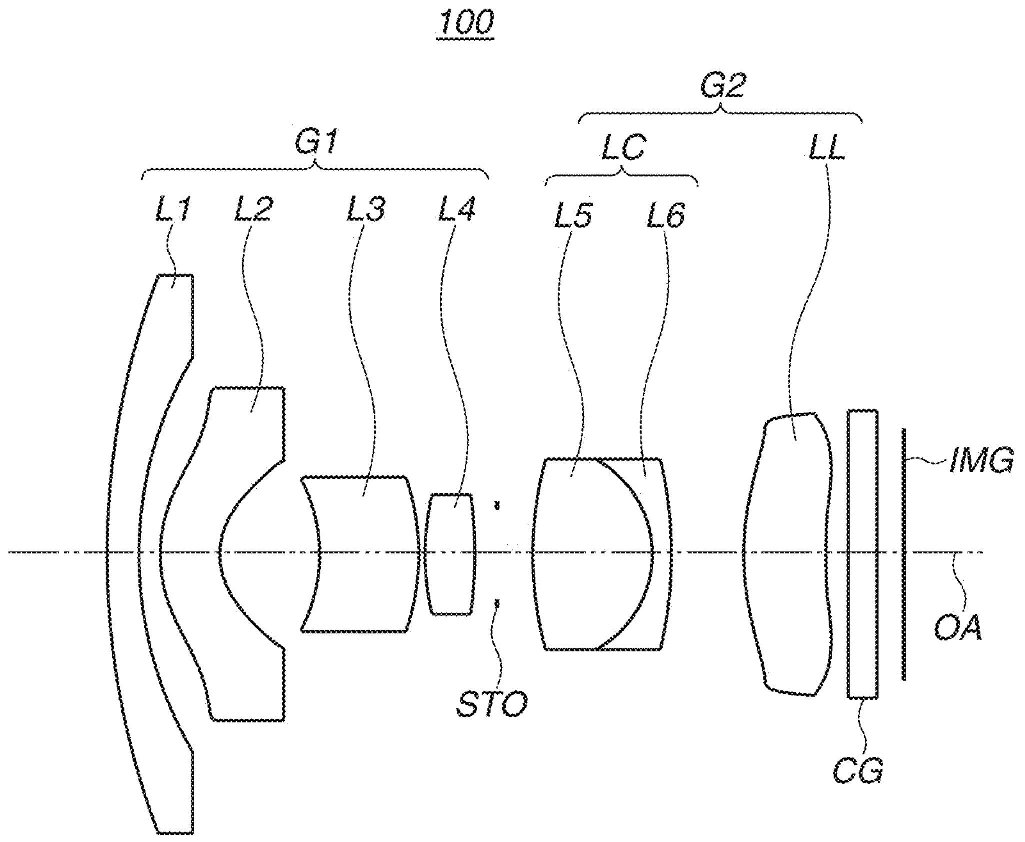
FIG. 1 is a diagram schematically illustrating a main portion of an optical system according to a first exemplary embodiment.

Hereinafter, desirable exemplary embodiments of the present invention will be described with reference to the drawings. The drawings may be drawn on a scale different from the actual scale for convenience. In the drawings, the same members are denoted by the same reference numerals, and the redundant descriptions will be omitted.

FIGS. 1, 3, 5, and 7 are cross-sectional views (including an optical axis OA) of optical systems according to a first to a fourth exemplary embodiment. Referring to each cross-sectional view, the left-hand side is the object side (anterior side), and the right-hand side is the image side (posterior side). The optical system according to each exemplary embodiment is an imaging optical system that is used for an imaging apparatus. An imaging plane of an image sensor is disposed in a position of an image plane IMG. An optical block CG disposed on the object side surface side of the image plane IMG is an optical element, such as an optical filter and a cover glass, that does not contribute to the image forming of the optical system. The optical system according to each exemplary embodiment may also be used as a projection optical system in a projection apparatus, such as a projector. In this case, the display surface of display elements, such as a liquid crystal panel, is disposed in the position of the image plane IMG.

FIGS. 2, 4, 6, and 8 are diagrams illustrating vertical aberrations according to a first to a fourth exemplary embodiment. Each vertical aberration illustrates the spherical aberration, curvature of field (astigmatism), and distortion from left to right. In each vertical aberration diagram, aberrations for 656.3 nm (C line), 587.6 nm (d line), 486.1 nm (F line), and 435.8 nm (g line) are drawn with different lines.

Features of the optical system according to each exemplary embodiment will be described in detail below.

The optical system according to each exemplary embodiment includes a front group G1 having positive refractive power, an aperture diaphragm STO, and a rear group G2 having positive refractive power, which are disposed from the object side to the image side in this order. In each exemplary embodiment, the optical block CG is not included in the optical system. The front group G1 includes a first lens L1 having negative refractive power, a second lens L2 having negative refractive power, a third lens L3, and a fourth lens L4 having positive refractive power, which are disposed from the object side to the image side in this order. The rear group G2 includes a cemented lens LC and a positive lens LL (final lens) disposed closest to the image side. A lens refers to an optical element having refractive power and does not refer to an optical element without refractive power, such as a parallel planar glass.

In the optical system according to each exemplary embodiment, the front group G1 and the rear group G2 have positive refractive power, and the front group G1 has the above-described configuration, whereby a wide angle of view is implemented with the reduced total length of the optical system. With the rear group G2 which is configured as described above, the image plane curvature and chromatic aberration of magnification due to an optical system having a wide angle of view is favorably corrected. The optical system according to each exemplary embodiment satisfies the following conditional expression (1), where f1 is the focal distance of the first lens L1, and d12 is the distance (interval) between the first lens L1 and the second lens L2 on the optical axis OA.

$$f1/d12 \leq -8.50 \tag{1}$$

Suitably setting the relation between the focal distance f1 and the distance d12 to satisfy the conditional expression (1) leads to a reduction in the outer diameters of the first lens L1 and the second lens L2, which leads to the achievement of downsizing of the entire system. If the upper limit of the conditional expression (1) is exceeded, the interval between the first lens L1 and the second lens L2 excessively increases, and the diameters of the first lens L1 and the second lens L2 is difficult to be reduced.

If the first lens L1 and the second lens L2 are brought close to each other to reduce the distance d12, the absolute value of f1/d12 approaches the infinite. However, except in a case where the cemented lens is formed of the first lens L1 and the second lens L2, it is desirable that the first lens L1 and the second lens L2 are separately disposed. Thus, it is desirable that the following conditional expression (1a) is satisfied:

$$-1.00\times10^3 \leq f1/d12 \leq -8.50. \tag{1a}$$

If the lower limit of the conditional expression (1a) is downwardly exceeded, the distance between the first lens L1 and the second lens L2 excessively deceases, which may cause the first lens L1 and the second lens L2 to undesirably come into contact with each other due to a manufacturing error, for example. It is further desirable to satisfy the following conditional expression (1b), and more desirable to satisfy the following conditional expression (1c):

$$-8.00\times10^2 \leq f1/d12 \leq -9.00 \text{ and} \tag{1b}$$

$$-3.00\times10^2 \leq f1/d12 \leq -9.50. \tag{1c}$$

As long as the optical system according to each exemplary embodiment satisfies at least the above-described configuration, the effect of the present invention can be obtained. For example, the front group G1 may include lenses in addition to the first lens L1 to the fourth lens L4 (a total of five or more lenses). However, for the achievement of downsizing of the entire system, it is desirable that the front group G1 consists of four lenses. Since the third lens L3 has a small absolute value of power as described below, determination of which of the positive refractive power and the negative refractive power is provided by the third lens L3 is made according to the specifications of each optical system.

In an imaging apparatus, such as an on-vehicle camera (described below), not only a wide angle of view but also a large image-forming magnification in the vicinity of the optical axis (center region) is demanded. In an example case in which an imaging apparatus is disposed at the rear portion of a movable apparatus (vehicle), the implementation configuration may take a form in which an enlarged image corresponding to the center region as the main target region is displayed in an electronic rearview mirror, and the entire image including the peripheral region other than the center region is displayed on an in-vehicle display. Thus, it is desirable that the image-forming magnification (focal distance) of the optical system is set to be different between the center region and regions other than the center region.

Thus, it is desirable that the object side surface (lens surface on the object side) of the second lens L2 is an aspheric surface. With this configuration, the light from the radially peripheral portion out of the light flux from the first lens L1 is largely deflected toward the side of the optical axis OA by the object side surface of the second lens L2. Thus, the image-forming magnification between the center region and peripheral region of the optical system is easily set to be different from each other. In this case, it is desirable that the object side surface of the second lens L2 is an aspheric surface having an inflection point in a cross-section including the optical axis OA. Thus, an angle of view (a viewing angle) and the image-forming magnification in the center region are easily increased with a smaller number of lenses included in the optical system.

Figure 9:
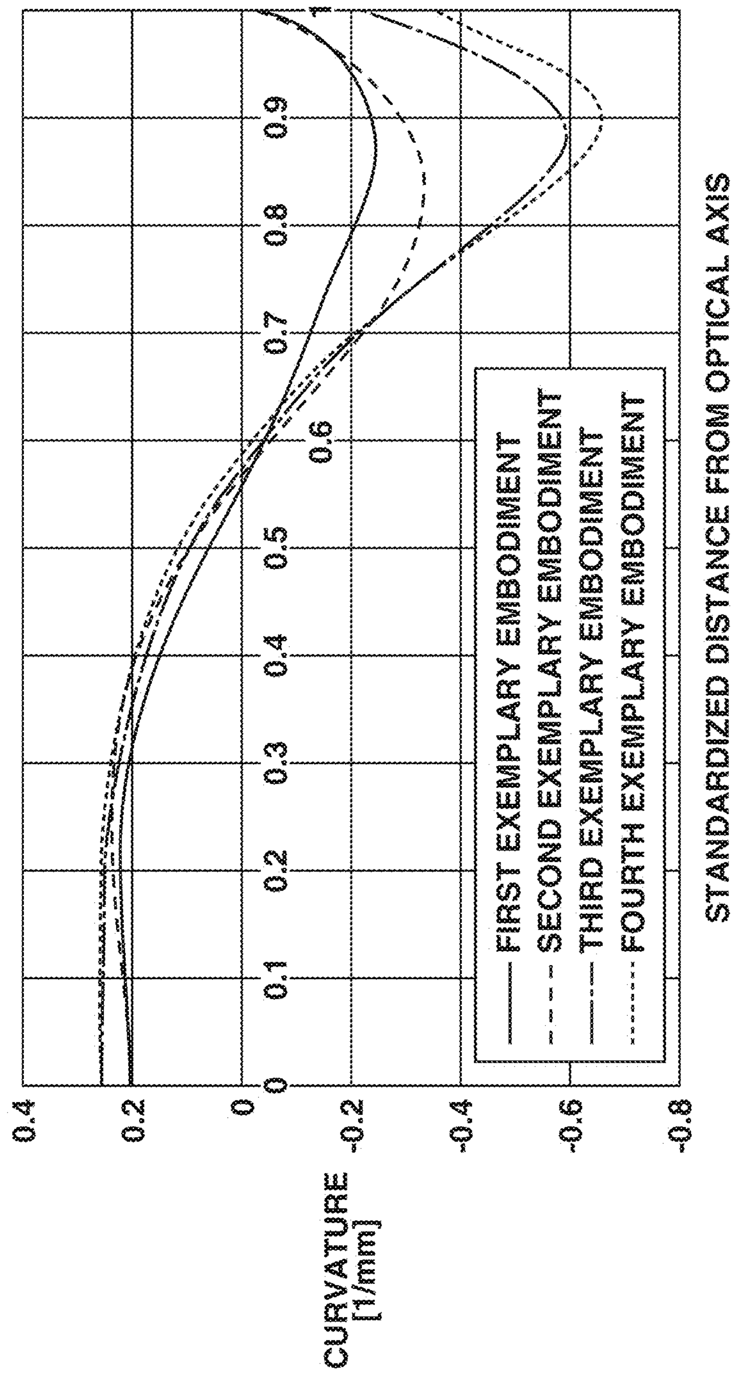
FIG. 9 is a diagram illustrating a shape of an aspheric surface of an object side surface of a second lens according to each exemplary embodiment.

FIG. 9 illustrates the shape of the aspheric surface of the object side surface of the second lens L2 according to each exemplary embodiment. Referring to FIG. 9, the horizontal axis indicates the radial position of the object side surface of the second lens L2 in the cross section including the optical axis OA, and the vertical axis indicates the curvature [1/mm] of the object side surface of the second lens L2. FIG. 9 illustrates a chart in which the curvature is plotted for different positions on the object side surface of the second lens L2. The numeric value on the horizontal axis indicates the distance (standardized distance) from the optical axis OA to each position within the effective diameter of the object side surface of the second lens L2 where the distance from the optical axis OA to the effective diameter (maximum effective diameter) is standardized to 1.

It is desirable that the object side surface of the second lens L2 is such an aspheric surface with which the chart representing the curvature for the distance from the optical axis OA illustrated in FIG. 9 has a plurality of extremal values. As illustrated in FIG. 9, the chart according to each exemplary embodiment has a first extremal value (maximal value) and a second extremal value (minimal value). With this configuration, the difference in the image-forming magnification between the center region and peripheral region of the optical system is emphasized, more specifically, the image-forming magnification of the center region is set larger than the image-forming magnification of the peripheral region, which improves the image visibility to the user of the imaging apparatus.

It is desirable that the optical system according to each exemplary embodiment satisfies the following conditional expressions (2) and (3), where E1 is the standardized distance from the optical axis OA to the position corresponding to the first extremal value and E2 is the standardized distance from the optical axis OA to the position corresponding to the second extremal value, on the object side surface of the second lens L2.

$$0.02 \leq E1 \leq 0.40 \tag{2}$$

$$0.60 \leq E2 \leq 0.98 \tag{3}$$

The conditional expressions (2) and (3) define suitable positions of the first extremal value and the second extremal value, respectively. Satisfying the conditional expression (2) leads to an easy increase in the focal distance of the center region of the optical system, and satisfying the conditional expression (3) leads to both an easy downsizing of the optical system and an easy increase in the angle of view. If the conditional expressions (2) and (3) are not satisfied, the image-forming magnification of the center and peripheral regions is difficult to be appropriately set, which is not desirable.

It is further desirable to satisfy the following conditional expressions (2a) and (3a), and more desirable to satisfy the following conditional expressions (2b) and (3b):

$$0.04 \leq E1 \leq 0.35, \tag{2a}$$

$$0.65 \leq E2 \leq 0.96, \tag{3a}$$

$$0.06 \leq E1 \leq 0.30, \text{ and} \tag{2b}$$

$$0.70 \leq E2 \leq 0.94. \tag{3b}$$

Further, it is desirable that the optical system according to each exemplary embodiment satisfies the following conditional expression (4), where fa1 is the focal distance of the air lens between the second lens L2 and the third lens L3, and f is the focal distance of the optical system (entire system).

$$-1.20 \leq fa1/f \leq -0.50 \tag{4}$$

Satisfying the conditional expression (4) leads to providing the air lens formed between the second lens L2 and the third lens L3 with negative power (refractive power) having a large value (large absolute value), which leads to further downsizing of the optical system. If the lower limit of the conditional expression (4) is downwardly exceeded, the negative power of the air lens excessively increases, which is undesirable because the optical performance fluctuations of the optical system increase if the arrangement of each lens is deviated by a manufacturing error. If the upper limit of the conditional expression (4) is exceeded, the negative power of the air lens excessively decreases, which is undesirable because the optical system is difficult to be further downsized.

It is desirable that the following conditional expression (4a) is satisfied, and more desirable that the following conditional expression (4b) is satisfied:

$$-1.10 \leq fa1/f \leq -0.55 \text{ and} \tag{4a}$$

$$-1.00 \leq fa1/f \leq -0.60. \tag{4b}$$

Further, it is desirable that the optical system according to each exemplary embodiment satisfies the following conditional expression (5), where fG1 is the focal distance of the front group G1, and fG2 is the focal distance of the rear group G2.

$$0.60 \leq fG1/fG2 \leq 1.50 \quad (5)$$

Satisfying the conditional expression (5) leads to suitable setting of the power of the front group G1 and the rear group G2, which leads to further downsizing of the optical system. If the lower limit of the conditional expression (5) is downwardly exceeded, the power of the front group G1 excessively increases, which is undesirable because the optical performance fluctuations of the optical system increase if the arrangement of each lens is deviated by a manufacturing error. If the upper limit of the conditional expression (5) is exceeded, the power of the front group G1 excessively decreases, which is undesirable because the optical system is difficult to be further downsized.

It is desirable that the following conditional expression (5a) is satisfied, and more desirable that the following conditional expression (5b) is satisfied:

$$0.65 \leq fG1/fG2 \leq 1.45 \text{ and} \quad (5a)$$

$$0.70 \leq fG1/fG2 \leq 1.40. \quad (5b)$$

Further, it is desirable that the optical system according to each exemplary embodiment satisfies the following conditional expression (6), where R1 is the curvature radius of the image side surface of the first lens L1, and R2 is the curvature radius of the object side surface of the first lens L1.

$$-3.50 \leq (R2+R1)/(R2-R1) \leq -1.85 \quad (6)$$

The conditional expression (6) represents a desired shape (shape factor) of the first lens L1. If the lower limit of the conditional expression (6) is downwardly exceeded, the outer diameter of the first lens L1 increases, which is undesirable because the optical system is difficult to be further downsized. If the upper limit of the conditional expression (6) is exceeded, the light (outermost off-axis ray) traveling from the first lens L1 toward the outermost off-axis image height is difficult to be captured, which is undesirable because the angle of view of the optical system is difficult to be further increased.

It is desirable that the following conditional expression (6a) is satisfied, and more desirable that the following conditional expression (6b) is satisfied:

$$-3.20 \leq (R2+R1)/(R2-R1) \leq -1.88 \text{ and} \quad (6a)$$

$$-3.00 \leq (R2+R1)/(R2-R1) \leq -1.90. \quad (6b)$$

On the optical axis OA, it is desirable that the first lens L1 and the second lens L2 are meniscus lenses (negative meniscus lenses) having a convex shape toward the object side, the third lens L3 is a meniscus lens having a concave shape toward the object side, and the fourth lens L4 is a biconvex lens. With this configuration, the incidence angle of each light beam to the rear group G2 is reduced, and optical performance fluctuations due to an arrangement error (manufacturing error) of each lens are prevented.

While it is desirable that the cemented lens LC of the rear group G2 includes a positive lens and a negative lens to easily reduce the chromatic aberration of magnification, the cemented lens LC may include three or more lenses, however, it is desirable that the cemented lens LC consists of two lenses to downsize the entire system and facilitate the manufacturing. Also, the rear group G2 may include a lens other than the cemented lens LC and the positive lens LL. For example, like the third exemplary embodiment illustrated in FIG. 5, a lens L5 may be disposed on the object side of the cemented lens LC. It is desirable that determination of whether to provide a lens other than the cemented lens LC and the positive lens LL in the rear group G2 is made according to the specifications of each optical system and the required optical performance. For example, to easily reduce the curvature of field and the chromatic aberration of magnification with a small number of lenses with reduced influence of a manufacturing error, it is desirable the rear group G2 consists of the cemented lens LC and the positive lens LL.

It is desirable that the positive lens LL of the rear group G2 also includes an aspheric surface. In other words, it is desirable that at least one of the object side surface and the image side surface of the positive lens LL is an aspheric surface. Further, like the aspheric surface of the second lens L2 of the front group G1, it is desirable that the aspheric surface of the positive lens LL also includes an inflection point in a cross-section including the optical axis OA. This reduces the curvature of field that is caused by the aspheric surface of the second lens L2, with a smaller number of lenses in each optical system. It is desirable that the aspheric surface of the positive lens LL also has a plurality of extremal values, and more desirable to satisfy the above-described conditional expressions (2) and (3).

As described above, it is desirable each lens is made of a resin material (resin lens) since using aspherical lenses for the second lens L2 and the positive lens LL leads to improvement in the optical system performance. The resin material refers to a material composed primarily of a resin (plastic) but not limited to a material composed only of a resin, and the resin material includes a material containing a minute amount of non-resin materials (impurities). Using a resin material for each lens leads to reduction in the manufacturing cost because molding of an aspheric surface is easier than using a glass material for each lens.

However, the temperature coefficient of the refraction index of a resin lens is larger than that of a glass lens made of a common glass material. Therefore, if a resin lens is used only for the second lens L2 and the positive lens LL having high negative power, focus fluctuations due to temperature variations may be insufficiently canceled by each lens. Thus, it is desirable that a resin lens is also used for the third lens L3 to prevent focus fluctuations due to temperature variations. It is further desirable that the optical system according to each exemplary embodiment satisfies the following conditional expression (7), where f3 is the focal distance of the third lens L3, and f is the focal distance of the entire system.

$$|f/f3| \leq 0.15 \quad (7)$$

Appropriately setting the power of the third lens L3 to satisfy the conditional expression (7) leads to the easy prevention of focus variations of each optical system due to temperature variations. If the conditional expression (7) is not satisfied, the absolute value of the power of the third lens L3 excessively increases, which is undesirable since focus variations of each optical system due to temperature variations is difficult to be prevented.

It is further desirable to satisfy the following conditional expression (7a), and more desirable to satisfy the following conditional expression (7b):

$$|f/f3| \leq 0.13 \text{ and} \quad (7a)$$

$$|f/f3| \leq 0.12. \quad (7b)$$

A resin lens may be used as appropriate for lenses other than the second lens L2, the third lens L3, and the positive lens LL. However, since a resin lens has a relatively large temperature coefficient of the refraction index as described above, it is desirable that a glass lens is used for at least one lens to prevent focus variations due to temperature variations. As described above, it is further desirable that a resin lens is used only for the second lens L2 and the positive lens LL having an aspheric surface, and the third lens L3 for canceling focus variations due to the second lens L2 and the positive lens LL. Since a resin lens is easier to be processed than a glass lens, it is desirable that both the object side surface and the image side surface of a resin lens are aspheric surfaces. This leads to implementation of favorable optical performance with a smaller number of lenses in each optical system.

Where the second lens L2 and the third lens L3 have a combined focal distance f23, even if the optical system according to each exemplary embodiment does not satisfy the conditional expression (1), satisfying the following conditional expression (8) leads to obtaining of similar effects that a wide angle of view and downsizing are implemented.

$$2.4 \leq f23/fa1 \leq 16.0 \quad (8)$$

Suitably setting the relationship between the focal distances f23 and fa1 to satisfy the conditional expression (8) leads to a reduction in the total length of the optical system, which leads to implementation of the entire system downsizing. If the lower limit of the conditional expression (8) is downwardly exceeded, the absolute value of the power of the air lens between the second lens L2 and the third lens L3 excessively decreases, which leads to a difficulty in reducing the total length of the optical system. Alternatively, the absolute value of the power of the combined focal distance of the second lens L2 and the third lens L3 excessively increases, which leads to a difficulty in preventing optical performance fluctuations of the optical system if the arrangement of each lens is deviated by a manufacturing error. Further, if the upper limit of the conditional expression (8) is exceeded, the absolute value of the power of the air lens between the second lens L2 and the third lens L3 excessively increases, which leads to a difficulty in preventing optical performance fluctuations of the optical system if the arrangement of each lens is deviated by a manufacturing error. Alternatively, the absolute value of the power of the combined focal distance of the second lens L2 and the third lens L3 excessively decreases, which leads to a difficulty in increasing the angle of view of the optical system.

It is desirable to satisfy the following conditional expression (8a), and more desirable to satisfy the following conditional expression (8b):

$$2.6 \leq f23/fa1 \leq 15.0 \text{ and} \quad (8a)$$

$$2.8 \leq f23/fa1 \leq 14.0. \quad (8b)$$

Desirably, the optical system according to each exemplary embodiment satisfies the following conditional expression (9), where f2R2 is the focal distance of the image side surface of the second lens L2, and f3R1 is the focal distance of the object side surface of the third lens L3.

$$2.0 \leq f3R1/f2R2 \leq 7.0 \quad (9)$$

Appropriately setting the focal distances (power) of the image side surface of the second lens L2 and the object side surface of the third lens L3 to satisfy conditional expression (9) leads to a reduction in the outer diameter of the first lens L1, which leads to downsizing of the entire system. If the lower limit of the conditional expression (9) is downwardly exceeded, the absolute value of the power of the image side surface of the second lens L2 excessively decreases, which is undesirable since the diameter of the first lens L1 is difficult to be reduced. If the upper limit of the conditional expression (9) is exceeded, the absolute value of the power of the image side surface of the second lens L2 excessively increases, which is undesirable since optical performance fluctuations of the optical system is difficult to be prevented if the arrangement of each lens is deviated by a manufacturing error.

It is desirable to satisfy the following conditional expression (9a), and more desirable to satisfy the following conditional expression (9b):

$$2.3 \leq f3R1/f2R2 \leq 6.7 \text{ and} \quad (9a)$$

$$2.5 \leq f3R1/f2R2 \leq 6.5. \quad (9b)$$

The configuration of the optical system according to each exemplary embodiment will be described below.

First Exemplary Embodiment

As illustrated in FIG. 1, an optical system 100 according to the first exemplary embodiment includes the first lens L1, the second lens L2, the third lens L3, the fourth lens L4, the aperture diaphragm STO, the cemented lens LC, and the positive lens LL, which are disposed from the object side to the image side in this order. The light flux from an object (not illustrated) is condensed on the image plane IMG through each lens and a cover glass CG, and an image of the object is formed. The optical system 100 according to the present exemplary embodiment has a sufficiently wide total angle of view of 180 degrees (a half angle of view of ±90 degrees) and a sufficiently long focal distance (center focal distance) of 4.4 mm on the optical axis OA.

According to the present exemplary embodiment, the third lens L3 has negative refractive power, and the cemented lens LC consists of the positive lens L5 and a negative lens L6, which are disposed from the object side to the image side in this order. The second lens L2 and the positive lens LL have an aspheric surface. More specifically, for each of the second lens L2 and the positive lens LL, the object side surface and the image side surface are aspheric surfaces having an inflection point in a cross-section including the optical axis OA. Each lens according to the present exemplary embodiment is a glass lens made of a glass material, and each aspheric surface is formed by glass molding.

Figure 2:
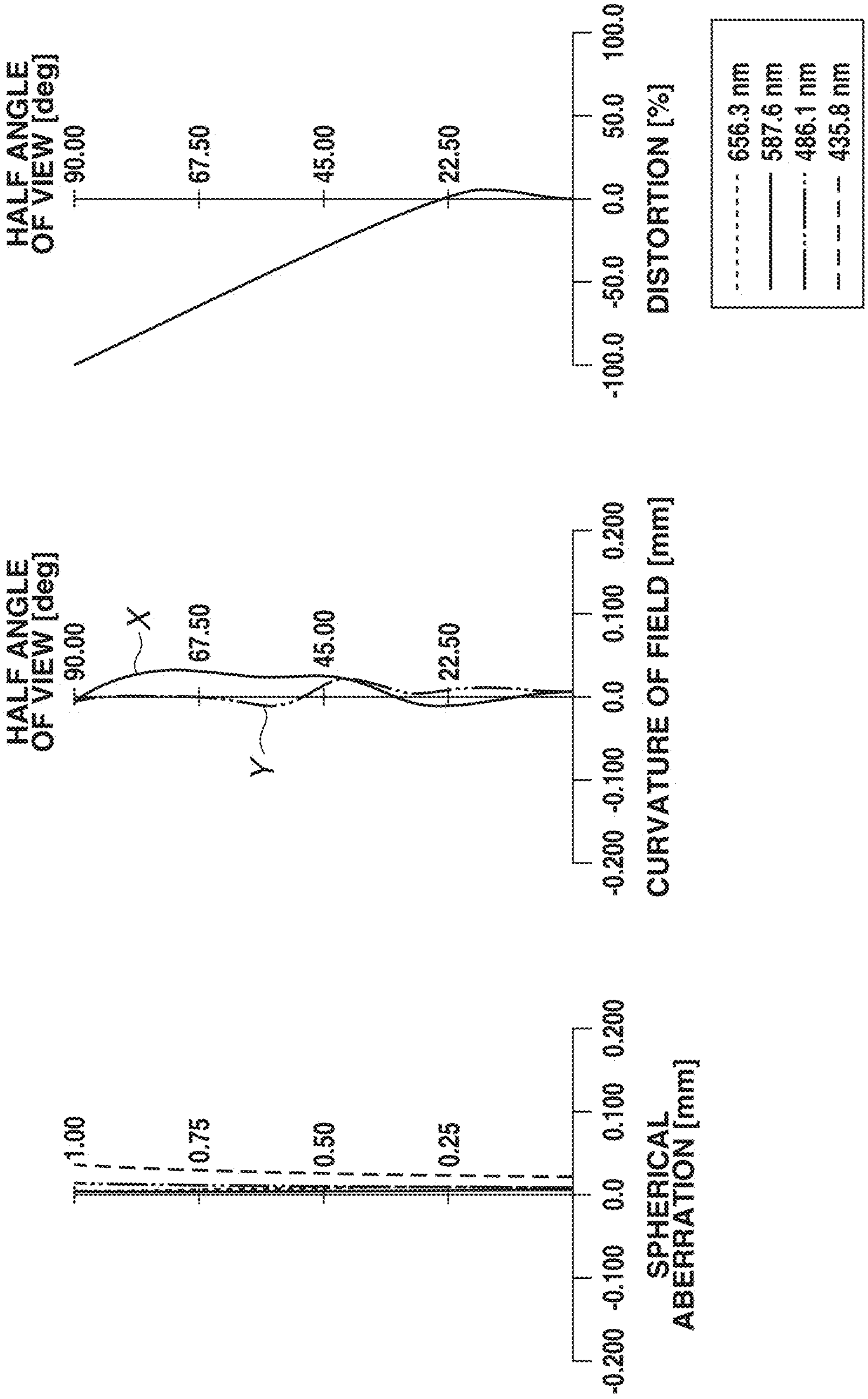
FIG. 2 is a diagram illustrating aberration of the optical system according to the first exemplary embodiment.

As illustrated in FIG. 2, the spherical aberration and the curvature of field are favorably corrected in the optical system 100 according to the present exemplary embodiment. Distortion increases with increase in angle of view (image height) in the peripheral region and relatively decreases in the center region. This leads to a higher resolution in the center region than in the peripheral region, which improves the image visibility to the user of the imaging apparatus as described above.

Second Exemplary Embodiment

Figure 3:
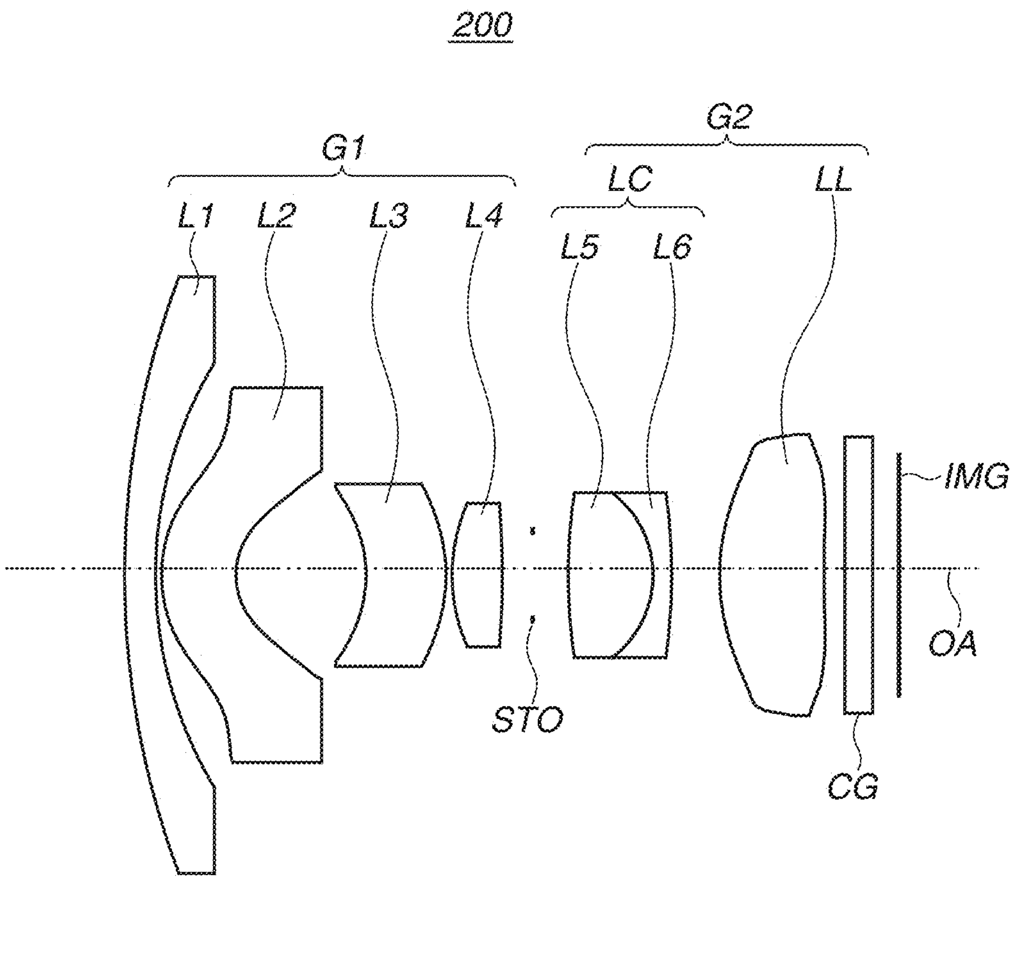
FIG. 3 is a diagram schematically illustrating a main portion of an optical system according to a second exemplary embodiment.

As illustrated in FIG. 3, an optical system 200 according to the second exemplary embodiment includes the first lens L1, the second lens L2, the third lens L3, the fourth lens L4, the aperture diaphragm STO, the cemented lens LC, and the positive lens LL, which are disposed from the object side to the image side in this order. According to the present exemplary embodiment, like the first exemplary embodiment, the third lens L3 has negative refractive power, and the cemented lens LC consists of the positive lens L5 and the negative lens L6, which are disposed from the object side to the image side in this order. The optical system 200 according to the present exemplary embodiment has a sufficiently wide angle of view of 180 degrees (a half angle of view of ±90 degrees) and a sufficiently long focal distance of 4.4 mm on the optical axis OA.

According to the exemplary embodiment, unlike the first exemplary embodiment, not only the second lens L2 and the positive lens LL but also the third lens L3 has an aspheric surface. More specifically, in each of the second lens L2, the third lens L3, and the positive lens LL, the image side surface and the object side surface are aspheric surfaces. While the aspheric surfaces of the second lens L2 and the positive lens LL have an inflection point in a cross-section including the optical axis OA, the aspheric surface of the third lens L3 does not have an inflection point. According to the present exemplary embodiment, unlike the first exemplary embodiment, each of the second lens L2, third lens L3, and the positive lens LL is made of a resin material, and other lenses are made of a glass material. More specifically, each aspheric surface is formed by plastic molding.

Figure 4:
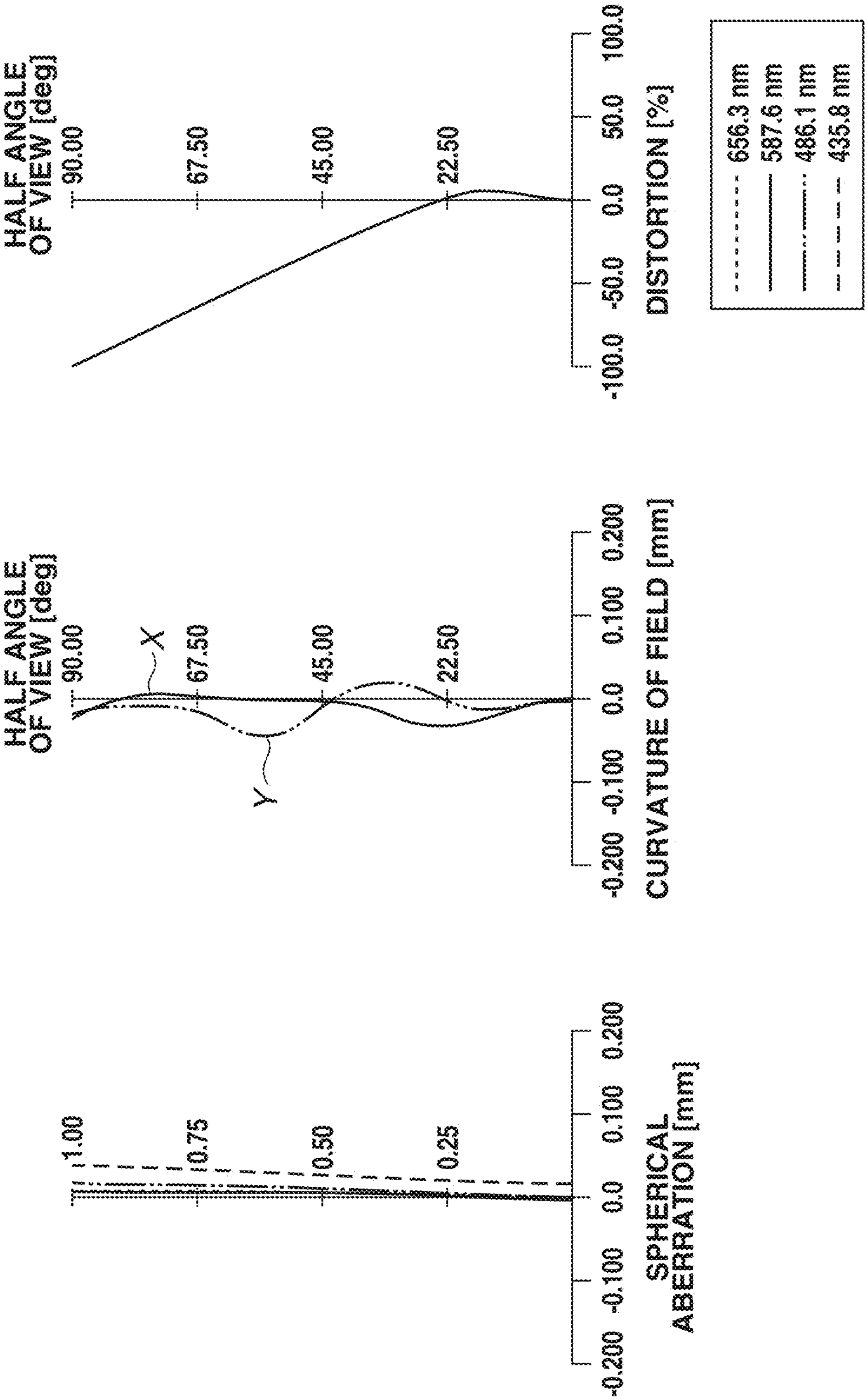
FIG. 4 is a diagram illustrating aberration of the optical system according to the second exemplary embodiment.

As illustrated in FIG. 4, the spherical aberration and the curvature of field are favorably corrected in the optical system 200 according to the present exemplary embodiment. Distortion increases with increase in angle of view in the peripheral region and relatively decreases in the center region.

Third Exemplary Embodiment

Figure 5:
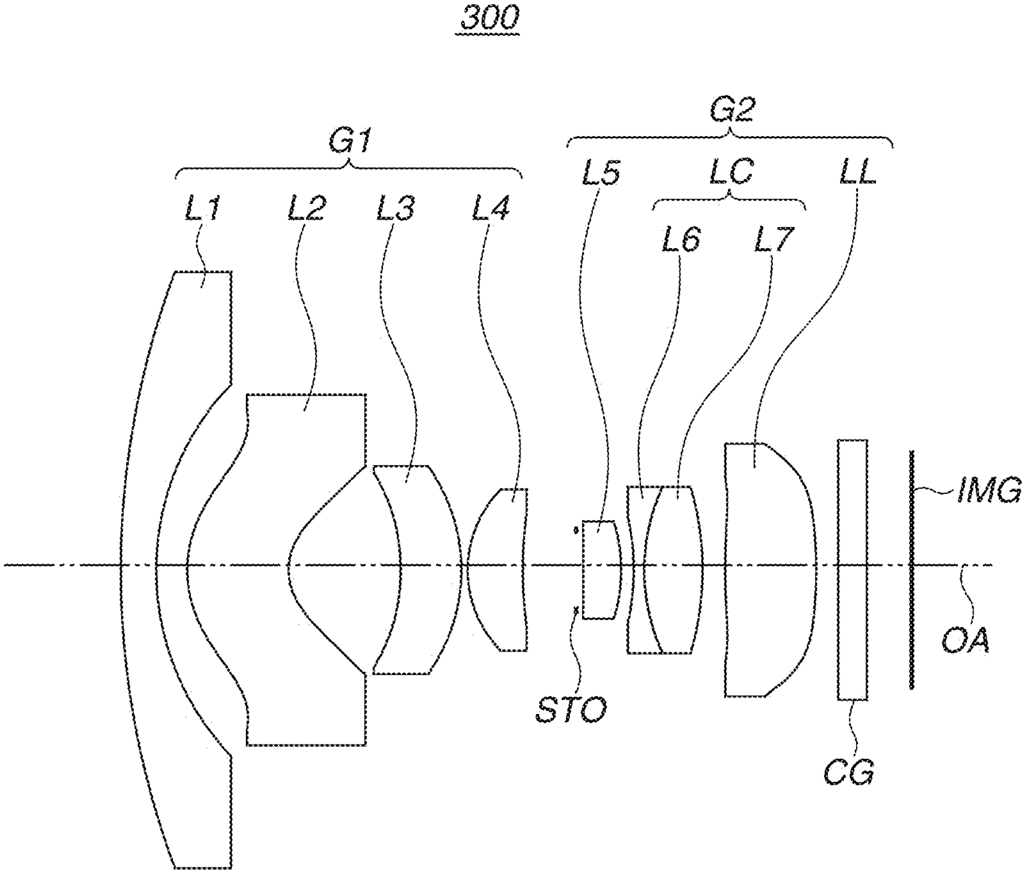
FIG. 5 is a diagram schematically illustrating a main portion of an optical system according to a third exemplary embodiment.

As illustrated in FIG. 5, an optical system 300 according to the third exemplary embodiment includes the first lens L1, the second lens L2, the third lens L3, the fourth lens L4, the aperture diaphragm STO, the fifth lens L5, the cemented lens LC, and the positive lens LL, which are disposed from the object side to the image side in this order. According to the present exemplary embodiment, unlike the first exemplary embodiment, the third lens L3 has positive refractive power, and the fifth lens L5 having positive refractive power is disposed in the object side surface of the cemented lens LC. The cemented lens LC consists of the negative lens L6 and a positive lens L7 which are disposed from the object side to the image side in this order. The optical system 300 according to the present exemplary embodiment has a sufficiently wide total angle of view of 180 degrees (a half angle of view of ±90 degrees) and a sufficiently long focal distance of 4.4 mm on the optical axis OA.

According to the present exemplary embodiment, unlike the first exemplary embodiment, not only the second lens L2 and the positive lens LL but also the third lens L3 and the fifth lens L5 have an aspheric surface. More specifically, in each of the second lens L2, the third lens L3, the fifth lens L5, and the positive lens LL, the object side surface and the image side surface are aspheric surfaces. The aspheric surfaces of the second lens L2 and the positive lens LL have an inflection point in a cross-section including the optical axis OA while the aspheric surfaces of the third lens L3 and the fifth lens L5 do not have an inflection point. According to the present exemplary embodiment, unlike the first exemplary embodiment, each of the second lens L2, the third lens L3, and the positive lens LL is made of a resin material, and other lenses are made of a glass material. The aspheric surfaces of each of the second lens L2, the third lens L3 and the positive lens LL are formed by plastic molding, and the aspheric surfaces of the fifth lens L5 are formed by glass molding.

Figure 6:
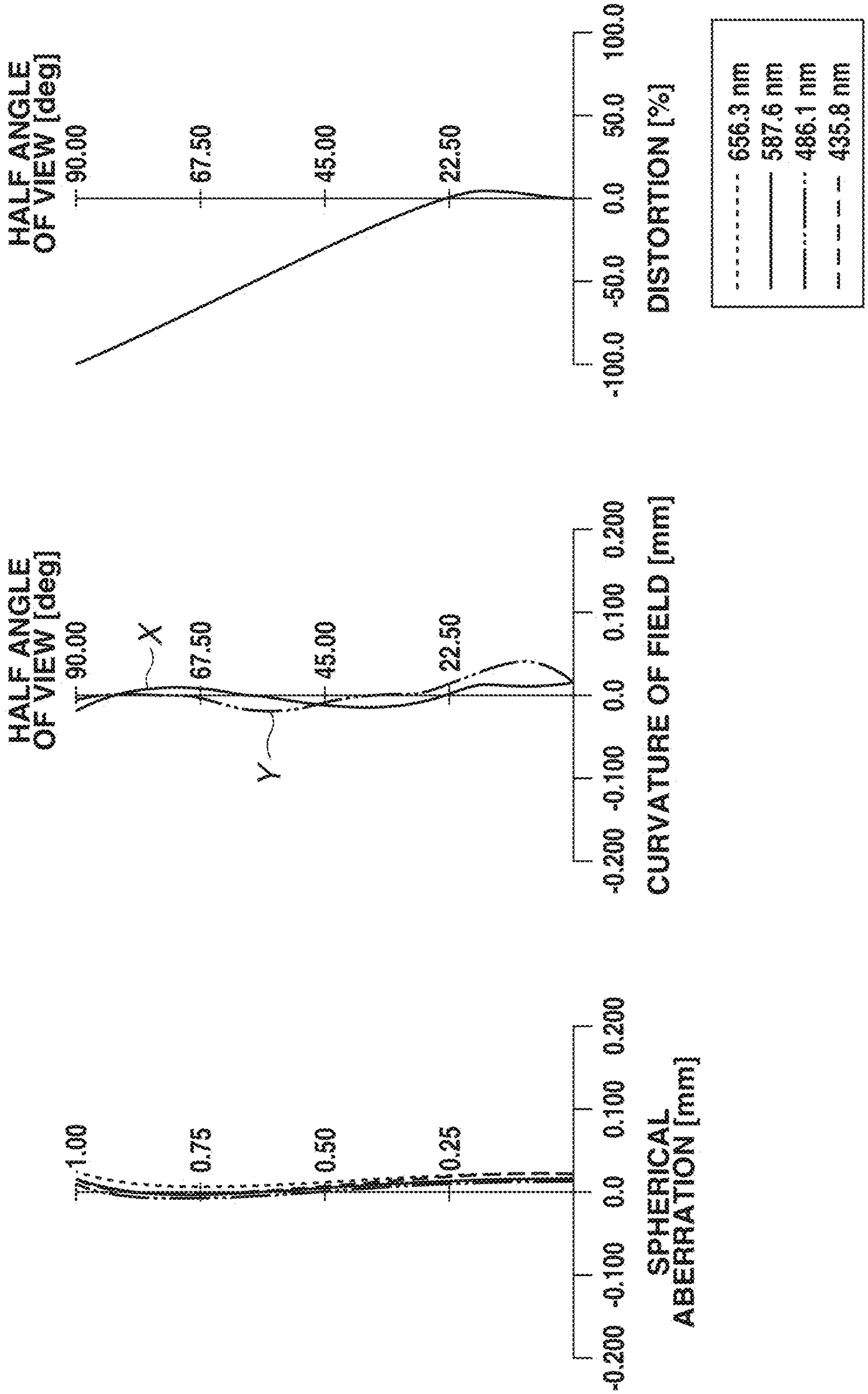
FIG. 6 is a diagram illustrating aberration of the optical system according to the third exemplary embodiment.

As illustrated in FIG. 6, the spherical aberration and the curvature of field are favorably corrected in the optical system 300 according to the present exemplary embodiment. Distortion increases with increase in angle of view in the peripheral region and relatively decreases in the center region.

Fourth Exemplary Embodiment

Figure 7:
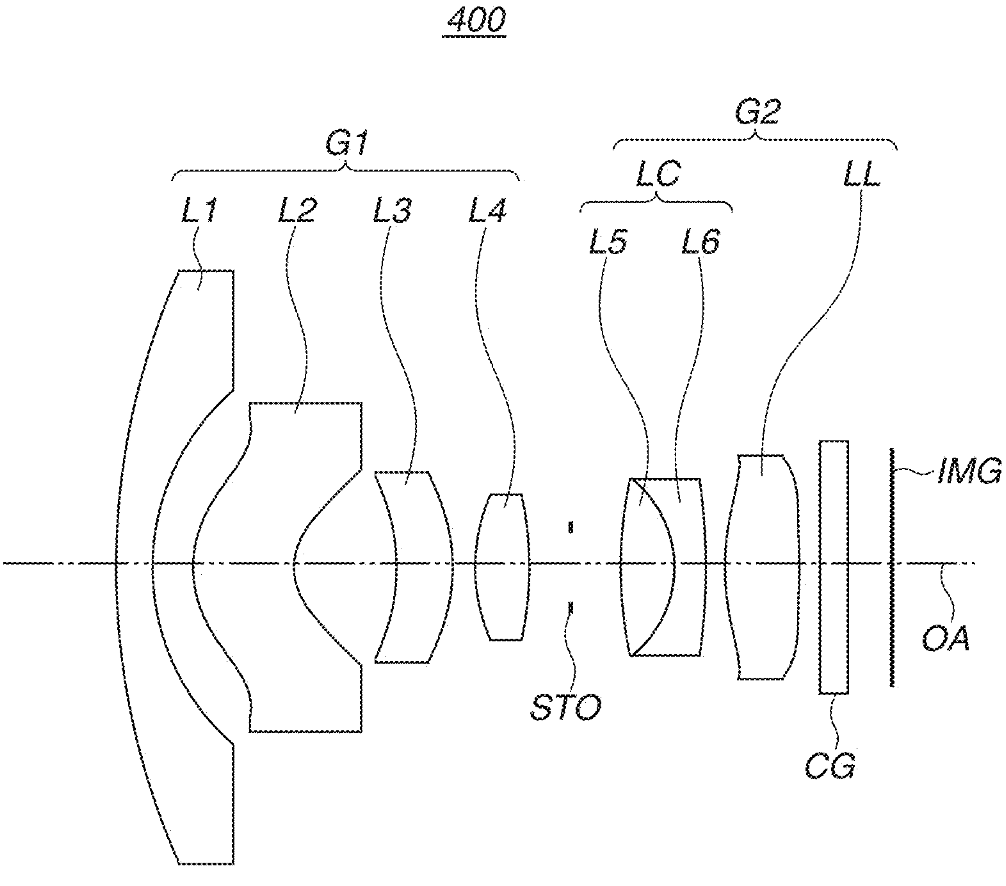
FIG. 7 is a diagram schematically illustrating a main portion of an optical system according to a fourth exemplary embodiment.

As illustrated in FIG. 7, an optical system 400 according to the fourth exemplary embodiment includes the first lens L1, the second lens L2, the third lens L3, the fourth lens L4, the aperture diaphragm STO, the cemented lens LC, and the positive lens LL, which are disposed from the object side to the image side in this order. The optical system 400 according to the present exemplary embodiment has a sufficiently wide total angle of view of 180 degrees (a half angle of view of ±90 degrees) and a sufficiently long focal distance of 4.4 mm on the optical axis OA.

According to the present exemplary embodiment, like the second exemplary embodiment, the third lens L3 has negative refractive power, and the cemented lens LC consists of the positive lens L5 and the negative lens L6 which are disposed from the object side to the image side in this order. In each of the second lens L2, the third lens L3, and the positive lens LL, the object side surface and the image side surface have an aspheric surface. According to the present exemplary embodiment, unlike the second exemplary embodiment, each of the second lens L2, the third lens L3, and the positive lens LL is made of a resin material.

Figure 8:
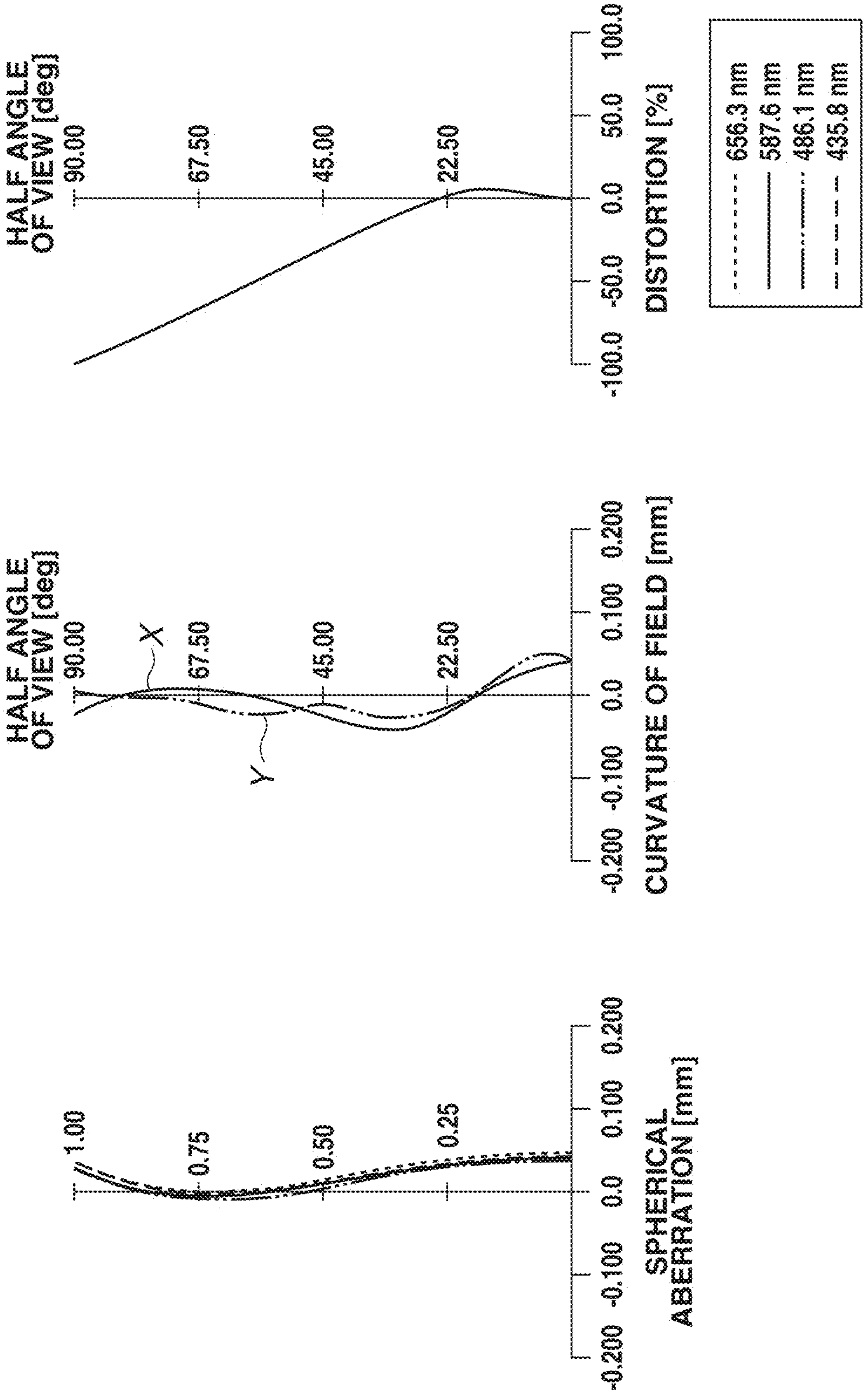
FIG. 8 is a diagram illustrating aberration of the optical system according to the fourth exemplary embodiment.

As illustrated in FIG. 8, the spherical aberration and the curvature of field are favorably corrected in the optical system 400 according to the present exemplary embodiment. Distortion increases with increase in angle of view in the peripheral region and relatively decreases in the center region.

First to fourth examples corresponding to the above-described first to fourth exemplary embodiments, respectively, will be described below. In each example, the surface number indicates the order of each optical surface when counted from the object surface, r [mm] is the curvature radius of the i-th optical surface, d [mm] is the distance (on the optical axis) between the i-th and the (i+1)-th optical surfaces, nd is the refraction index of the medium between the i-th and the (i+1)-th optical surfaces relative to the d line, and vd is the Abbe number of the medium relative to the d line. The Abbe number vd is the value defined by the following expression when the refraction indexes for the F, d, and C lines are nF, nd, and nC, respectively.

$$vd=(nd-1)/(nF-nC)$$

For an aspheric surface in each example, the surface number is indicated with a trailing asterisk mark (*). "E±P" in each numerical value means "$\times 10^{\pm P}$". The shape of each aspheric surface is represented by the following expression, where z is the displacement from the surface vertex in the optical axis direction, h is the height from the optical axis OA in the direction perpendicular to the optical axis direction, c is the curvature (reciprocal of the curvature radius r), k is the cone constant, and A, B, C, D, E, F, G, H, I . . . are aspheric surface coefficients.

[Formula 1]

$$z=\frac{ch^2}{1+\sqrt{1-(1+k)c^2h^2}}+Ah^4+Bh^6+Ch^8+Dh^{10}+Eh^{12}+Fh^{14}+Gh^{16}+Hh^{18}+Ih^{20}+\cdots$$

The optical system according to each example is a single focus optical system having a constant focal distance, configured to perform neither zooming nor focusing. This means that the distance between lenses configuring the optical system according to each example is constantly fixed. In this configuration, optical performance fluctuations by the movement of each lens are avoided. However, the optical system may be able to perform at least one of zooming and focusing as required, and hence configured to change the distance between lenses.

Numerical Exemplary Embodiment 1

Various data
Central focal length 4.4 mm
Fno 2.8
Half angle of view ±90°

Surface data

| Surface number | r | d | nd | vd |
|---|---|---|---|---|
| 1 | 24.64 | 1.00 | 1.703 | 52.4 |
| 2 | 12.20 | 0.67 | | |
| 3* | 4.86 | 1.87 | 1.583 | 59.5 |
| 4* | 2.44 | 3.13 | | |
| 5 | −5.08 | 3.11 | 1.595 | 67.7 |
| 6 | −7.50 | 0.20 | | |
| 7 | 8.20 | 1.56 | 1.583 | 59.4 |
| 8 | −13.98 | 0.70 | | |
| 9(STO) | ∞ | 1.12 | | |
| 10 | 11.26 | 3.75 | 1.603 | 65.4 |
| 11 | −3.40 | 0.60 | 1.785 | 25.7 |
| 12 | −12.99 | 2.27 | | |
| 13* | 9.44 | 2.58 | 1.583 | 59.5 |
| 14* | −1697.27 | 0.70 | | |
| 15 | ∞ | 0.90 | 1.560 | 56.0 |
| 16 | ∞ | 0.85 | | |

Aspherical coefficients

| Surface number | K | A | B | C | D |
|---|---|---|---|---|---|
| 3 | −4.499E−01 | 5.138E−03 | −1.389E−03 | 2.223E−04 | −3.240E−05 |
| 4 | −8.597E−01 | 1.547E−02 | −5.648E−03 | 1.575E−03 | −4.610E−04 |
| 13 | 0.000E+00 | 6.276E−03 | −3.280E−03 | 9.788E−04 | −2.079E−04 |
| 14 | 0.000E+00 | 2.784E−02 | −1.002E−02 | 2.165E−03 | −3.424E−04 |

| Surface number | E | F | G | H | I |
|---|---|---|---|---|---|
| 3 | 3.183E−06 | −1.933E−07 | 7.002E−09 | −1.390E−10 | 1.165E−12 |
| 4 | 1.122E−04 | −1.915E−05 | 2.114E−06 | −1.361E−07 | 3.895E−09 |
| 13 | 3.009E−05 | −2.816E−06 | 1.613E−07 | −5.130E−09 | 6.926E−11 |
| 14 | 3.840E−05 | −2.873E−06 | 1.340E−07 | −3.504E−09 | 3.913E−11 |

Numerical Exemplary Embodiment 2

| Various data<br>Central focal length 4.4 mm<br>Fno 2.8<br>Half angle of view ±90° | | | | |
|---|---|---|---|---|
| Surface data | | | | |
| Surface number | r | d | nd | νd |
| 1 | 27.36 | 1.00 | 1.703 | 52.4 |
| 2 | 13.37 | 0.05 | | |
| 3* | 4.92 | 2.40 | 1.536 | 56.0 |
| 4* | 2.42 | 4.20 | | |
| 5* | −3.99 | 2.58 | 1.536 | 56.0 |
| 6* | −5.38 | 0.20 | | |
| 7 | 5.71 | 1.62 | 1.583 | 59.4 |
| 8 | −29.74 | 0.98 | | |
| 9(STO) | ∞ | 1.15 | | |
| 10 | 17.63 | 2.74 | 1.603 | 65.4 |
| 11 | −3.35 | 0.60 | 1.785 | 25.7 |
| 12 | −19.47 | 1.55 | | |
| 13* | 6.80 | 3.38 | 1.536 | 56.0 |
| 14* | −43.69 | 0.66 | | |
| 15 | ∞ | 0.90 | 1.560 | 56.0 |
| 16 | ∞ | 0.85 | | |

| Aspherical coefficients | | | | | |
|---|---|---|---|---|---|
| Surface number | K | A | B | C | D |
| 3 | −4.634E−01 | 4.868E−03 | −7.845E−04 | 1.348E−04 | −1.747E−05 |
| 4 | −6.958E−01 | 1.742E−02 | −5.776E−03 | 3.092E−03 | −1.201E−03 |
| 5 | 0.000E+00 | 4.533E−03 | −1.467E−03 | 6.577E−04 | −2.115E−04 |
| 6 | 0.000E+00 | 1.574E−03 | −1.185E−04 | −1.584E−04 | 1.443E−04 |
| 13 | 0.000E+00 | 1.330E−03 | −1.183E−03 | 2.994E−04 | −4.603E−05 |
| 14 | 0.000E+00 | 1.670E−02 | −5.403E−03 | 8.838E−04 | −9.971E−05 |
| Surface number | E | F | G | H | I |
| 3 | 1.253E−06 | −5.205E−08 | 1.265E−09 | −1.681E−11 | 9.454E−14 |
| 4 | 2.696E−04 | −3.679E−05 | 3.043E−06 | −1.405E−07 | 2.785E−09 |
| 5 | 4.871E−05 | −7.65E−06 | 7.686E−07 | −4.394E−08 | 1.079E−09 |
| 6 | −5.423E−05 | 1.1252E−05 | −1.341E−06 | 8.630E−08 | −2.328E−09 |
| 13 | 4.955E−06 | −3.906E−07 | 2.128E−08 | −6.966E−10 | 1.010E−11 |
| 14 | 8.862E−06 | −6.139E−07 | 2.924E−08 | −8.120E−10 | 9.729E−12 |

Numerical Exemplary Embodiment 3

| Various data<br>Central focal length 4.4 mm<br>Fno 2.8<br>Half angle of view ±90° | | | | |
|---|---|---|---|---|
| Surface data | | | | |
| Surface number | r | d | nd | νd |
| 1 | 26.80 | 1.12 | 1.703 | 52.4 |
| 2 | 8.47 | 0.98 | | |
| 3* | 3.86 | 3.20 | 1.536 | 56.0 |
| 4* | 1.83 | 3.54 | | |
| 5* | −6.87 | 1.92 | 1.536 | 56.0 |
| 6* | −5.73 | 0.20 | | |
| 7 | 3.63 | 1.74 | 1.539 | 55.6 |
| 8 | 13.12 | 1.69 | | |
| 9(STO) | ∞ | 0.22 | | |
| 10* | 35.10 | 1.20 | 1.583 | 59.4 |
| 11* | −5.79 | 0.40 | | |
| 12 | −7.68 | 0.33 | 1.742 | 25.7 |
| 13 | 6.23 | 1.84 | 1.589 | 61.1 |
| 14 | −9.36 | 0.72 | | |
| 15* | 23.06 | 2.88 | 1.536 | 56.0 |
| 16* | −9.62 | 0.69 | | |

-continued

| Various data<br>Central focal length 4.4 mm<br>Fno 2.8<br>Half angle of view ±90° | | | | |
|---|---|---|---|---|
| Sphere | ∞ | 0.90 | 1.569 | 56.4 |
| Sphere | ∞ | 1.43 | | |

Aspherical coefficients

| Surface number | K | A | B | C | D |
|---|---|---|---|---|---|
| 3 | −5.513E−01 | 1.621E−03 | −4.817E−04 | 8.237E−05 | −1.292E−05 |
| 4 | −8.615E−01 | 5.511E−03 | −1.955E−03 | −1.456E−04 | −2.832E−05 |
| 5 | 0.000E+00 | −2.677E−03 | 1.363E−04 | −1.769E−04 | 1.235E−04 |
| 6 | 0.000E+00 | −6.872E−04 | −3.457E−04 | 2.432E−04 | −6.088E−05 |
| 10 | 0.000E+00 | −8.697E−03 | −1.594E−03 | 3.830E−04 | −1.179E−04 |
| 11 | 0.000E+00 | −4.873E−03 | −4.025E−04 | −7.694E−05 | 2.965E−05 |
| 15 | 0.000E+00 | 2.170E−03 | −1.611E−03 | 1.453E−04 | 7.909E−05 |
| 16 | 0.000E+00 | 1.445E−02 | −5.089E−03 | 8.968E−04 | −1.162E−04 |

| Surface number | E | F | G | H | I |
|---|---|---|---|---|---|
| 3 | 1.073E−06 | −5.062E−08 | 1.380E−09 | −2.026E−11 | 1.228E−13 |
| 4 | 3.229E−05 | −7.139E−06 | 7.722E−07 | −4.358E−08 | 1.034E−09 |
| 5 | −3.507E−05 | 5.4319E−06 | −4.927E−07 | 2.477E−08 | −5.312E−10 |
| 6 | 8.232E−06 | −6.181E−07 | 2.074E−08 | 1.389E−10 | −2.085E−11 |
| 10 | 0.000E+00 | 0.000E+00 | 0.000E+00 | 0.000E+00 | 0.000E+00 |
| 11 | 0.000E+00 | 0.000E+00 | 0.000E+00 | 0.000E+00 | 0.000E+00 |
| 15 | −3.374E−05 | 6.0816E−06 | −5.992E−07 | 3.159E−08 | −6.970E−10 |
| 16 | 1.118E−05 | 7.948E−07 | 3.965E−08 | −1.235E−09 | 1.792E−11 |

Numerical Exemplary Embodiment 4

Various data
Central focal length 4.4 mm
Fno 2.8
Half angle of view ±90°

Surface data

| Surface number | r | d | nd | νd |
|---|---|---|---|---|
| 1 | 23.47 | 1.17 | 1.703 | 52.4 |
| 2 | 7.57 | 1.31 | | |
| 3* | 3.82 | 3.25 | 1.536 | 56.0 |
| 4* | 1.99 | 3.30 | | |
| 5* | −7.32 | 1.81 | 1.536 | 56.0 |
| 6* | −6.04 | 0.72 | | |
| 7 | 5.80 | 1.75 | 1.514 | 69.5 |
| 8 | −10.77 | 1.33 | | |
| 9(STO) | ∞ | 1.61 | | |
| 10 | 13.56 | 1.73 | 1.589 | 61.1 |
| 11 | −3.65 | 1.01 | 1.878 | 25.7 |
| 12 | −20.26 | 0.62 | | |
| 13* | 9.91 | 2.39 | 1.536 | 56.0 |
| 14* | −10.47 | 0.66 | | |
| 15 | ∞ | 0.90 | 1.569 | 56.4 |
| 16 | ∞ | 1.43 | | |

Aspherical coefficients

| Surface number | K | A | B | C | D |
|---|---|---|---|---|---|
| 3 | −5.553E−01 | 2.035E−03 | −4.672E−04 | 7.196E−05 | −1.144E−05 |
| 4 | −7.682E−01 | 5.504E−03 | −1.152E−03 | −1.293E−03 | 5.350E−04 |
| 5 | 0.000E+00 | −3.664E−03 | −4.244E−04 | 4.473E−04 | −8.862E−05 |
| 6 | 0.000E+00 | −1.413E−03 | −4.265E−04 | 6.189E−04 | −2.342E−04 |
| 13 | 0.000E+00 | 1.133E−02 | −5.796E−03 | 1.694E−03 | −3.406E−04 |
| 14 | 0.000E+00 | 2.836E−02 | −7.958E−03 | 1.011E−03 | 1.905E−05 |

| Surface number | E | F | G | H | I |
|---|---|---|---|---|---|
| 3 | 8.964E−07 | −3.696E−08 | 7.803E−10 | −6.415E−12 | −8.093E−15 |
| 4 | −1.181E−04 | 1.707E−05 | −1.562E−06 | 8.018E−08 | −1.731E−09 |

-continued

| Various data<br>Central focal length 4.4 mm<br>Fno 2.8<br>Half angle of view ±90° | | | | | |
|---|---|---|---|---|---|
| 5 | 5.675E−06 | 5.5065E−07 | −1.298E−07 | 9.501E−09 | −2.564E−10 |
| 6 | 4.960E−05 | −6.471E−06 | 5.148E−07 | −2.282E−08 | 4.308E−10 |
| 13 | 4.642E−05 | −4.141E−06 | 2.245E−07 | −6.385E−09 | 6.590E−11 |
| 14 | −1.504E−05 | 2.5115E−06 | −1.928E−07 | 7.525E−09 | −1.203E−10 |

The following table illustrates values related to the conditional expressions for the optical system according to each of the above-described exemplary embodiments. The following table also illustrates values related to the conditional expression (10) (described below). As illustrated in the table, the optical system according to each exemplary embodiment satisfies related conditional expressions.

TABLE 1

| | | Example 1 | Example 2 | Example 3 | Example 4 |
|---|---|---|---|---|---|
| | f1 | −35.47 | −38.30 | −18.08 | −16.38 |
| | d12 | 0.67 | 0.05 | 0.98 | 1.31 |
| | fa1 | −3.59 | −3.19 | −3.40 | −3.76 |
| | f | 4.38 | 4.38 | 4.40 | 4.38 |
| | fG1 | 12.71 | 8.82 | 10.88 | 7.57 |
| | fG2 | 9.52 | 9.79 | 8.15 | 9.37 |
| | R1 | 24.64 | 27.36 | 26.80 | 23.47 |
| | R2 | 12.20 | 13.37 | 8.47 | 7.57 |
| | f3 | −50.57 | −81.81 | 40.68 | 42.85 |
| | f23 | −10.62 | −13.08 | −26.66 | −42.83 |
| | f2R2 | −4.18 | −4.5 | −3.41 | −3.71 |
| | f3R1 | −13.58 | −11.41 | −19.65 | −20.95 |
| (1) | f1/d12 | −52.90 | −766.00 | −18.40 | −12.50 |
| (2) | E1 | 0.20 | 0.26 | 0.08 | 0.12 |
| (3) | E2 | 0.88 | 0.84 | 0.88 | 0.90 |
| (4) | fa1/f | −0.82 | −0.73 | −0.77 | −0.86 |
| (5) | fG1/fG2 | 1.34 | 0.90 | 1.34 | 0.81 |
| (6) | (R2 + R1)/(R2 − R1) | −2.96 | −2.91 | −1.92 | −1.95 |
| (7) | f/f3 | −0.09 | −0.05 | 0.11 | 0.10 |
| (8) | f23/fa1 | 2.96 | 4.10 | 7.84 | 11.39 |
| (9) | f3R1/f2R2 | 3.25 | 2.53 | 5.76 | 5.65 |
| (10) | f × sin(θmax)/y(θmax) | 1.11 | 1.11 | 1.17 | 1.16 |

[Imaging Apparatus]

Figure 10:
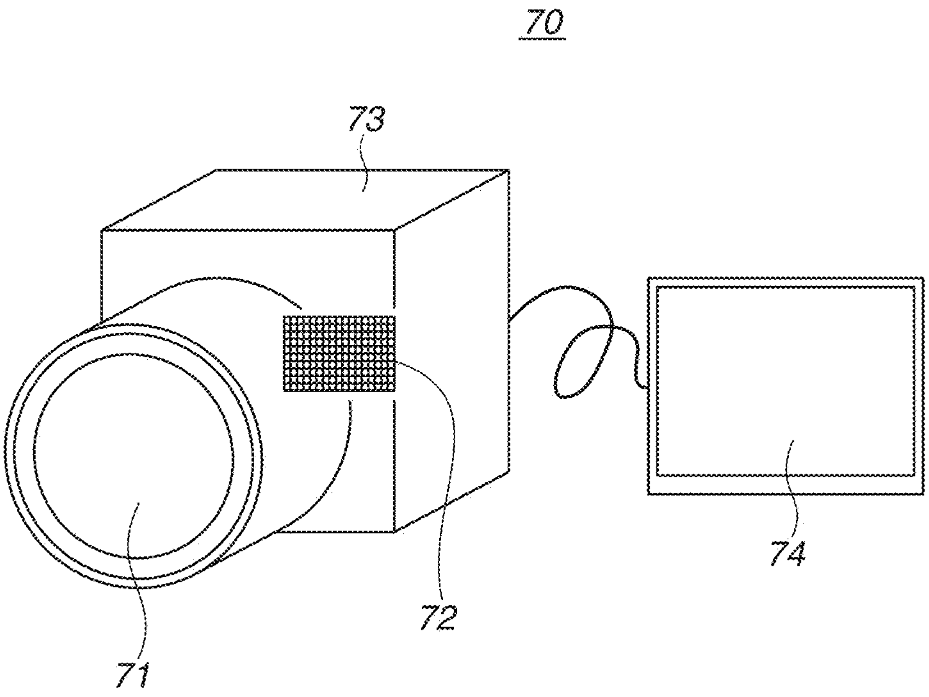
FIG. 10 is a schematic view illustrating an imaging apparatus according to an exemplary embodiment.

FIG. 10 is a schematic view illustrating main portions of an imaging apparatus 70 according to an exemplary embodiment of the present invention. The imaging apparatus 70 according to the present exemplary embodiment includes an optical system (imaging optical system) 71 according to one of the above-described exemplary embodiments, a light receiving element 72 for photoelectrically converting an object image formed by the optical system 71, and a camera body (housing) 73 for holding the light receiving element 72. The optical system 71 is held by a lens barrel (holding member) and is connected to the camera body 73. As illustrated in FIG. 7, the camera body 73 may be connected to a display unit 74 for displaying an image captured by the light receiving element 72. As the light receiving element 72, an image sensor (photoelectric conversion element), such as a charge coupled device (CCD) sensor and a complementary metal oxide semiconductor (CMOS) sensor, is used.

When the imaging apparatus 70 is used as a distance measurement apparatus, for example, an image sensor (imaging plane phase-difference sensor) having pixels capable of dividing the light flux from an object into two for photoelectric conversion is applicable as the light receiving element 72. In a case where a subject is on the front focal plane of the optical system 71, no positional deviation occurs in images corresponding to the two division light fluxes on the image plane of the optical system 71. However, a positional deviation occurs in each image in a case where the subject is at a position other than the front focal plane of the optical system 71. Because the positional deviation of each image corresponds to the displacement from the front focal plane of the subject, the positional deviation amount and the positional deviation direction are acquired for each image by using an imaging plane phase-difference sensor so that the distance to the subject is measured.

The optical system 71 and the camera body 73 may be configured to be attachable to and detachable from each other. More specifically, the optical system 71 and the lens barrel may be configured as an interchangeable lens (lens apparatus). The optical system according to each of the above-described exemplary embodiments is applicable not only to imaging apparatuses, such as digital still cameras, silver film cameras, video cameras, on-vehicle cameras, and monitoring cameras but also to diverse types of optical apparatuses, such as telescopes, binoculars, projectors (projection apparatuses), and digital copying machines.

[On-Vehicle System]

Figure 11A:
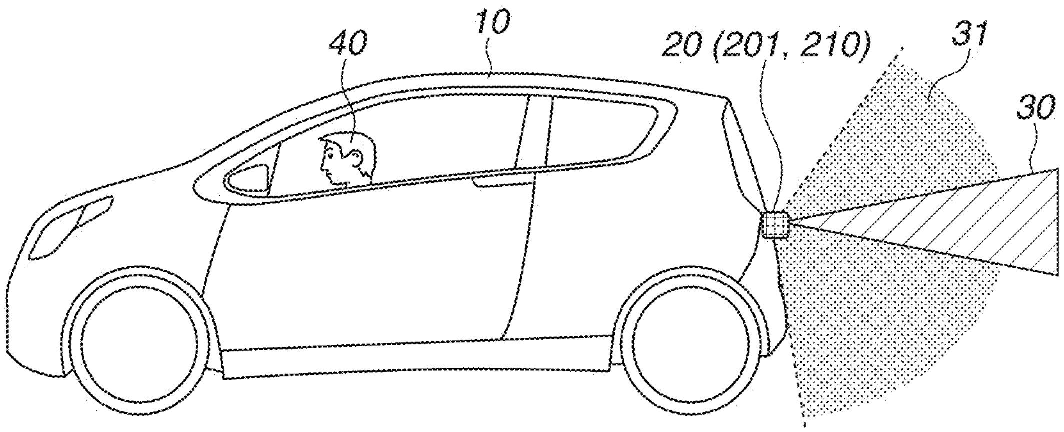
FIG. 11A is a schematic view illustrating a movable apparatus according to an exemplary embodiment.

FIG. 11A is a schematic view illustrating a movable apparatus 10 and an imaging apparatus 20 (on-vehicle camera) according to an exemplary embodiment of the present invention. FIG. 11A illustrates a case where the movable apparatus 10 is an automobile (vehicle). The movable apparatus 10 includes an on-vehicle system (drive assisting apparatus, not illustrated) for assisting a user 40 (driver or fellow passenger) of the movable apparatus 10 by using images captured by the imaging apparatus 20. While the present exemplary embodiment indicates a case where the imaging apparatus 20 is disposed to capture an image of the rear of the movable apparatus 10, the imaging apparatus 20 may be disposed to capture images of the front and sides of the movable apparatus 10. Two or more imaging apparatuses 20 may be disposed at two or more different positions on the movable apparatus 10.

The imaging apparatus 20 includes an optical system 201 and an imaging unit 210 according to one of the above-described exemplary embodiments. The optical system 201 is a different-angle of view lens having different image-forming magnifications in a first angle of view (first field of view) 30 and a second angle of view (second field of view) 31 larger than the first angle of view 30. The imaging plane (light receiving plane) of the imaging unit 210 includes a first region where an object included in the first angle of view 30 is captured, and a second region where an object included in the second angle of view 31 is captured. In this configuration, the number of pixels per unit angle of view in the first region is larger than the number of pixels per unit angle of view in the second region other than the first region.

In other words, the resolution in the first angle of view (first region) of the imaging apparatus 20 is higher than the resolution in the second angle of view (second region).

Figure 11B:
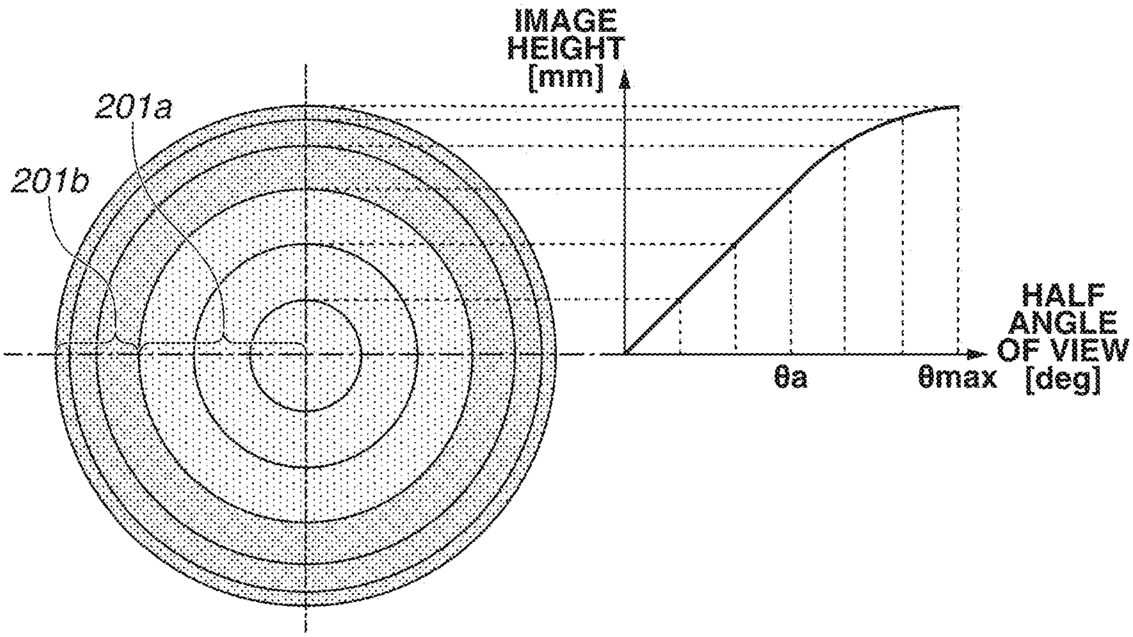
FIG. 11B illustrates optical characteristics of an optical system according to an exemplary embodiment.

The optical characteristics of the optical system 201 will be described in detail below. The left-hand drawing of FIG. 11B illustrates the image height y [mm] at different half angle of views θ [deg.] on the imaging plane of the imaging unit 210 in contour lines. The right-hand drawing of FIG. 11B illustrates a relationship between different half angle of views θ and the image height y (projection characteristic of the optical system 201) in the first quadrant of the left-hand drawing.

As illustrated in FIG. 11B, the optical system 201 is configured to have the projection characteristic y(θ) different between angle of views less than a predetermined half angle of view θa and angle of views equal to or larger than the half angle of view θa. Thus, the increased amount of the image height y to the half angle of view θ per unit (resolution) is also different for each angle of view. The local resolution of the optical system 201 is represented by the derivative of the projection characteristic y(θ) with respect to the half angle of view θ, dy(θ)/dθ. The left-hand drawing of FIG. 11B illustrates that the resolution increases with increase in distance between the contours of the image height y with respect to different half angle of views θ. The right-hand drawing of FIG. 11B illustrates that the resolution increases with increase in gradient of the chart of the projection characteristic y(θ).

Referring to the left-hand drawing of FIG. 11B, a first region 201*a* as the center region corresponds to angle of views less than the half angle of view θa, and a second region 201*b* as the peripheral region corresponds to angle of views equal to or larger than the half angle of view θa. Angle of views less than the half angle of view θa correspond to the first angle of view 30 in FIG. 11A. A total angle of angle of views less than the half angle of view θa and angle of views equal to or larger than the half angle of view θa correspond to the second angle of view 31 in FIG. 11A. As described above, the first region 201*a* is a high-resolution and low-distortion region, and the second region 201*b* is a low-resolution and high-distortion region.

It is desirable that the ratio of the half angle of view θa to a maximum angle of view θmax, θa/θmax, is 0.15 degrees or more and 0.35 degrees or less, and more desirably, 0.16 degrees or more and 0.25 degrees or less. For example, since the maximum angle of view θmax=90 degrees in each of the above-described exemplary embodiments, it is desirable that the value of the half angle of view θa is 13.5 degrees or more and 31.5 degrees or less, and more desirably, 14.4 degrees or more and 22.5 degrees or less.

The optical system 201 is configured to have the projection characteristic y(θ) in the first region 201*a* different from f×θ (equidistant projection method), and the projection characteristic y(θ) is also different from the projection characteristic in the second region 201*b*. In this case, desirably, the projection characteristic y(θ) of the optical system 201 satisfies the following conditional expression (10):

$$1.0 < f \times \sin(\theta max)/y(\theta max) \leq 1.9. \quad (10)$$

Satisfying the conditional expression (10) leads to implementation of a wide angle of view of the optical system 201 by reducing the resolution in the second region 201*b*. Further, the resolution in the first region 201*a* is set to be higher than that in the center region of a common fisheye lens with the positive projection method (y(θ)=f×sin θ). If the lower limit of the conditional expression (2) is downwardly exceeded, it is undesirable because the resolution in the first region 201*a* decreases and the maximum image height therein is higher than a fisheye lens with the positive projection method, which leads to an increase in the size of the optical system. If the upper limit of the conditional expression (2) is exceeded, the resolution in the first region 201*a* excessively increases, it is undesirable because implementation of a wide angle of view equivalent to a fisheye lens with the positive projection method is difficult, and favorable optical performances are not maintained.

It is desirable to satisfy the following conditional expression (10a), and more desirable to satisfy the following conditional expression (10b):

$$1.0 < f \times \sin(\theta max)/y(\theta max) \leq 1.7 \quad (10a)$$

and $$1.0 < f \times \sin(\theta max)/y(\theta max) \leq 1.4. \quad (10b)$$

As described above, the optical system 201 has a small distortion and a high resolution in the first region 201*a*, and therefore obtains images in the first region 201*a* with higher definition than in the second region 201*b*. Thus, setting the first region 201*a* (first angle of view 30) as the target region of the user 40 results in obtaining of favorable visibility. For example, in a case where the imaging apparatus 20 is disposed on a posterior portion of the movable apparatus 10 as illustrated in FIG. 11A, displaying an image corresponding to the first angle of view 30 on the electronic rearview mirror provides a natural perspective when the user 40 watches a rear vehicle. On the other hand, the second region 201*b* (second angle of view 31) corresponds to a wide angle of view including the first angle of view 30. For example, when the movable apparatus 10 is running backward, displaying the image corresponding to the second angle of view 31 on the in-vehicle display helps the driving of the user 40.

Figure 12:
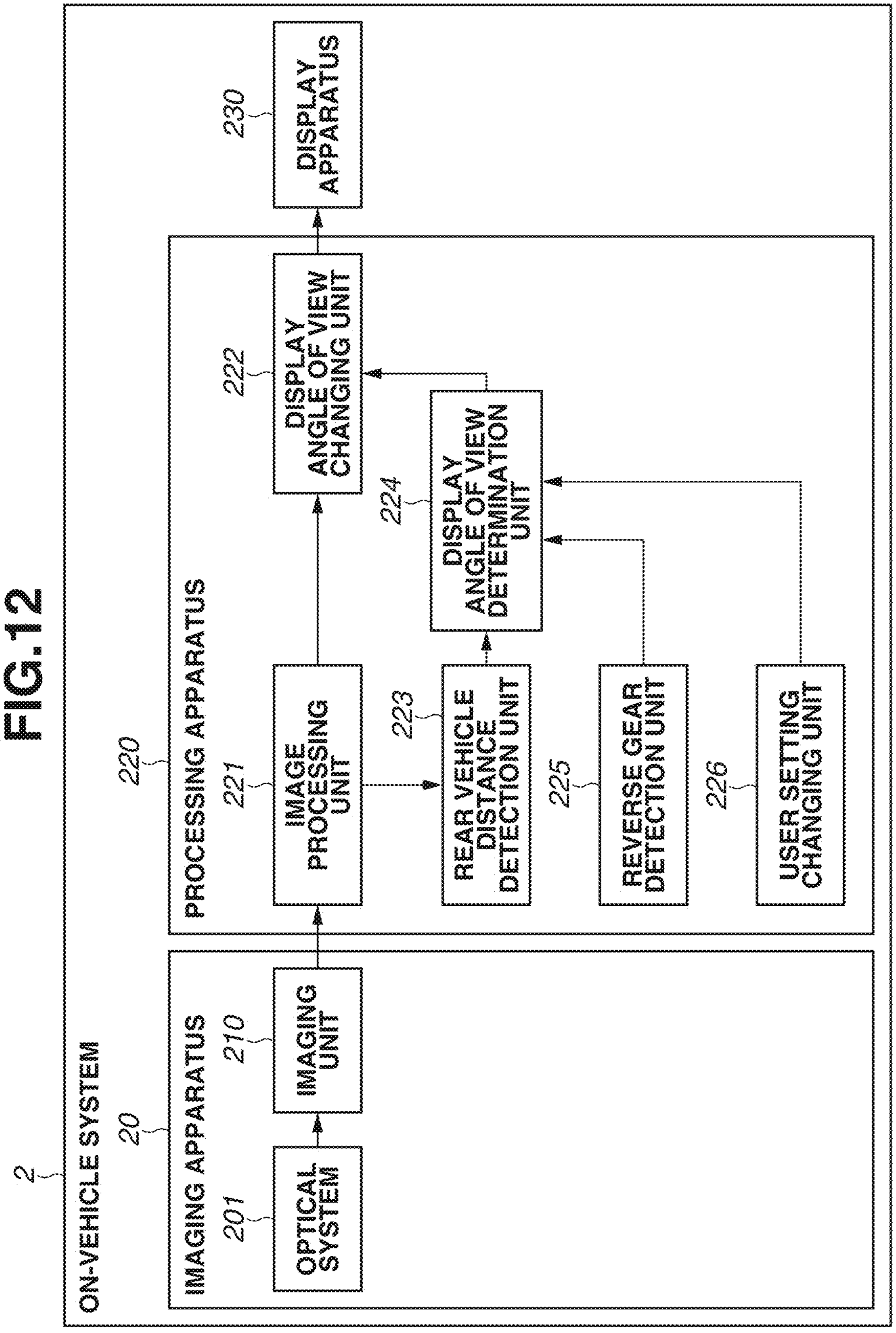
FIG. 12 is a block diagram illustrating an example configuration of an on-vehicle system according to an exemplary embodiment.

FIG. 12 is a functional block diagram illustrating an example configuration of an on-vehicle system 2 according to the present exemplary embodiment. The on-vehicle system 2 displays, to user 40, an image captured by the imaging apparatus 20 installed in a rear position of the movable apparatus 10. The on-vehicle system 2 includes the imaging apparatus 20, a processing apparatus 220, and a display apparatus (display unit) 230. The imaging apparatus 20 includes the optical system 201 and the imaging unit 210, as described above. The imaging unit 210 including an image sensor, such as a CCD sensor and a CMOS sensor, generates imaging data by photoelectrically converting the optical image formed by the optical system 201 and outputs the data to the processing apparatus 220.

The processing apparatus 220 includes an image processing unit 221, a display angle of view determination unit 224 (determination unit), a user setting changing unit 226 (first changing unit), a rear vehicle distance detection unit 223 (first detection unit), a reverse gear detection unit 225 (second detection unit), and a display angle of view changing unit 222 (second changing unit). For example, the processing apparatus 220 is a computer, such as a central processing unit (CPU), and a microcomputer, and functions as a control unit for controlling operations of different components based on a computer program. At least one component of the processing apparatus 220 may be implemented by a hardware component, such as an application specific integrated circuit (ASIC) and a programmable logic array (PLA).

The image processing unit 221 performs image processing, such as wide dynamic range (WDR) correction, gamma correction, look up table (LUT) processing, and distortion correction on the imaging data acquired from the imaging unit 210 to generate image data. The distortion correction is performed on at least the imaging data corresponding to the second region 201*b*. This makes it easier for the user 40 to visually recognize the image displayed on the display apparatus 230, which improves the rate of detecting the rear vehicle by the rear vehicle distance detection unit 223. The distortion correction for the imaging data corresponding to the first region 201*a* may be skipped. The image processing unit 221 outputs the image data generated by the above-described image processing to the display angle of view changing unit 222 and the rear vehicle distance detection unit 223.

By using the image data output from the image processing unit 221, the rear vehicle distance detection unit 223 acquires information about the distance to the rear vehicle included in the image data corresponding to the range not including the first angle of view 30 out of the second angle of view 31. For example, the rear vehicle distance detection unit 223 detects the rear vehicle based on the image data corresponding to the second region 201*b* in the image data, and calculates the distance from the rear vehicle to the self-vehicle based on variations in the position and size of the detected rear vehicle. The rear vehicle distance detection unit 223 outputs information about the calculated distance to the display angle of view determination unit 224.

Further, the rear vehicle distance detection unit 223 may determine the car model of the rear vehicle based on data about feature information (shape, color, etc.) for each car model output as a result of machine learning (deep learning) based on images of a large number of vehicles. In this case, the rear vehicle distance detection unit 223 may output information about the car model of the rear vehicle to the display angle of view determination unit 224. The reverse gear detection unit 225 detects whether the transmission of the movable apparatus 10 (self-vehicle) is in the reverse gear and outputs the detection result to the display angle of view determination unit 224.

The display angle of view determination unit 224 determines the angle of view (display angle of view) of the image to be displayed on the display apparatus 230 out of the first angle of view 30 and the second angle of view 31, based on the output from at least one of the rear vehicle distance detection unit 223 and the reverse gear detection unit 225. The display angle of view determination unit 224 outputs the information to the display angle of view changing unit 222 according to the determination result. For example, in a case where the distance value in distance information downwardly reaches a threshold value (e.g., 3 m) or below, the display angle of view determination unit 224 determines to set the second angle of view 31 as the display angle of view, and in a case where the distance value exceeds the threshold value, the display angle of view determination unit 224 determines to set the first angle of view 30 as the display angle of view. Alternatively, in a case where the display angle of view determination unit 224 receives a notification that the transmission of the movable apparatus 10 is in the reverse gear from the reverse gear detection unit 225, the display angle of view determination unit 224 determines to set the second angle of view 31 as the display angle of view. In a case where the transmission is not in the reverse gear, the display angle of view determination unit 224 determines to set the first angle of view 30 as the display angle of view.

In a state where the transmission of the movable apparatus 10 is in the reverse gear, the display angle of view determination unit 224 determines to set the second angle of view 31 as the display angle of view, regardless of the determination result by the rear vehicle distance detection unit 223. In a case where the transmission of the movable apparatus 10 is not in the reverse gear, the display angle of view determination unit 224 determines to set the display angle of view according to the detection result by the rear vehicle distance detection unit 223. In response to receipt of vehicle information from the rear vehicle distance detection unit 223, the display angle of view determination unit 224 may change the determination criterion of whether to change the angle of view, according to the car model of the movable apparatus 10. For example, in a case where the movable apparatus 10 is a large-sized vehicle such as a truck, the braking distance is normally longer than that of an ordinary vehicle, and thus it is desirable that the above-mentioned threshold value is set to be longer than that for an ordinary vehicle (e.g., 10 m).

The user setting changing unit 226 allows the user 40 to change the determination criterion of whether to change the display angle of view to the second angle of view 31, via the display angle of view determination unit 224. The determination criterion set (changed) by the user 40 is input from the user setting changing unit 226 to the display angle of view determination unit 224.

The display angle of view changing unit 222 generates a display image to be displayed on the display apparatus 230, according to the determination result by the display angle of view determination unit 224. For example, in a case where the display angle of view determination unit 224 determines to set the first angle of view 30 as the display angle of view, the display angle of view changing unit 222 clips a rectangular narrow-angle image (first image) from the image data corresponding to the first angle of view 30 and outputs the clipped image to the display apparatus 230. In a case where a rear vehicle satisfying a predetermined condition exists in the image data corresponding to the second angle of view 31, the display angle of view changing unit 222 outputs the image (second image) including the relevant rear vehicle to the display apparatus 230. The second image may include the image corresponding to the first region 201*a*. The display angle of view changing unit 222 functions as a display control unit for performing display control to change between a first display state where the display apparatus 230 displays the first image and a second display state where the display apparatus 230 displays the second image.

The display angle of view changing unit 222 clips an image by storing the image data output from the image processing unit 221 in a storage unit (memory), such as a RAM, and reading the image to be clipped. The region corresponding to the first image in the image data is a rectangular region in the first angle of view 30 corresponding to the first region 201*a*. The region corresponding to the second image in the image data is a rectangular region including the relevant rear vehicle in the second angle of view 31 corresponding to the second region 201*b*.

The display apparatus 230 includes a display unit, such as a liquid crystal display and an organic electroluminescence display, and displays the display image output from the display angle of view changing unit 222. For example, the display apparatus 230 includes a first display unit as the electronic rearview mirror disposed in an upper portion of the windshield of the movable apparatus 10, and a second display unit as an operation panel (monitor) disposed in a lower portion of the windshield of the movable apparatus 10. With this configuration, the first image and the second image generated from the above-described image data are displayed on the first display unit and the second display unit, respectively. The first display unit may include, for example, a half mirror and may be configured to be used as a mirror when not used as a display. The second display unit may also serve, for example, as a display of a navigation system or audio system.

The movable apparatus 10 is not limited to a vehicle, such as an automobile, but may be a moving object, such as a ship, aircraft, industrial robot, and drone. While the on-vehicle system 2 according to the present exemplary embodiment is used to display images to the user 40, the use of the on-vehicle system 2 is not limited thereto. The on-vehicle system 2 may be used for cruise control (including an all-vehicle speed tracking function) and driving assistance, such as automatic driving. Further, the on-vehicle system 2 is applicable not only to a movable apparatus but also to diverse types of apparatuses utilizing object recognition, such as an intelligent transport system (ITS).

[Modifications]

The optical system according to each of the above-described exemplary embodiments is to be used in the visible region and is configured to perform favorable aberration correction in the entire visible region. However, the wavelength region where aberration correction is performed can be changed as appropriate. For example, each optical system may be configured to perform aberration correction only in a specific wavelength region of the visible region, or configured to perform aberration correction in the wavelength region of the infrared region other than the visible region.

The on-vehicle system 2 may adopt the above-described distance measurement apparatus as the imaging apparatus 20. In this case, the on-vehicle system 2 may include a determination unit for determining the possibility of collision with a target object based on information about the distance to the target object acquired by the imaging apparatus 20. A stereo camera including two imaging units 210 may be employed as the imaging apparatus 20. In this case, processing similar to the above-described processing can be performed by acquiring image data through the two different imaging units in synchronization and using the two pieces of image data, even without using an imaging plane phase-difference sensor. In a case where the difference in imaging time between the two imaging units is known, the imaging units do not need to be in synchronization.

Although the desirable exemplary embodiments and examples of the present invention have been described above, the present invention is not limited to these exemplary embodiments and examples, and various combinations, modifications, and changes can be made within the scope of the gist of the present invention. To publicize the scope of the present invention, the following claims are appended.

According to the present invention, it is possible to provide a small-sized optical system with a wide angle of view and an imaging apparatus including the small-sized optical system with the wide angle of view.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An optical system comprising a front group having positive refractive power, an aperture diaphragm, and a rear group having positive refractive power, which are disposed from an object side to an image side in this order, wherein the front group includes a first lens having negative refractive power, a second lens having negative refractive power, a third lens, and a fourth lens having positive refractive power, which are disposed from the object side to the image side in this order, wherein the rear group includes a cemented lens and a positive lens disposed closest to the image side, wherein an object side surface of the second lens is an aspheric surface having an inflection point in a cross-section including an optical axis, wherein a chart representing a curvature of the aspheric surface with respect to radial positions in the cross-section including the optical axis includes a first extremal value and a second extremal value, and wherein a following conditional expression is satisfied:

$$f1/d12 \leq -8.50$$

where f1 is a focal distance of the first lens, and d12 is a distance between the first lens and the second lens on the optical axis.

2. The optical system according to claim 1, wherein a following conditional expression is satisfied:

$$2.4 \leq f23/fa1 \leq 16.0$$

where f23 is a combined focal distance of the second lens and the third lens, and fa1 is a focal distance of an air lens between the second lens and the third lens.

3. The optical system according to claim 1, wherein a following conditional expression is satisfied:

$$0.02 \leq E1 \leq 0.40$$

where E1 is a standardized distance from the optical axis to a position corresponding to the first extremal value on the aspheric surface.

4. The optical system according to claim 3, wherein a following conditional expression is satisfied:

$$0.60 \leq E2 \leq 0.98$$

where E2 is a standardized distance from the optical axis to a position corresponding to the second extremal value on the aspheric surface.

5. The optical system according to claim 1, wherein an increase amount of an image height per unit angle of view in a first region including the optical axis is larger than an increase amount of an image height per unit angle of view in a second region which is on a peripheral side with respect to the first region.

6. The optical system according to claim 1, wherein the rear group consists of the cemented lens and the positive lens.

7. The optical system according to claim 1, wherein a following conditional expression is satisfied:

$$-1.20 \leq fa1/f \leq -0.50$$

where fa1 is the focal distance of the air lens between the second lens and the third lens, and f is a focal distance of the optical system.

8. The optical system according to claim 1, wherein a following conditional expression is satisfied:

$$0.6 \leq fG1/fG2 \leq 1.5$$

where fG1 is a focal distance of the front group, and fG2 is a focal distance of the rear group.

9. The optical system according to claim 1, wherein a following conditional expression is satisfied:

$$-3.50 \leq (R2+R1)/(R2-R1) \leq -1.85$$

where R1 is a curvature radius of an object side surface of the first lens, and R2 is a curvature radius of an image side surface of the first lens.

10. The optical system according to claim 1, wherein a following conditional expression is satisfied:

$$2.0 \leq f3R1/f2R2 \leq 7.0$$

where f2R2 is a focal distance of an image side surface of the second lens, and f3R1 is a focal distance of an object side surface of the third lens.

11. The optical system according to claim 1, wherein on the optical axis, the first lens and the second lens are meniscus lenses having a convex shape toward the object side, the third lens is a meniscus lens having a concave shape toward the object side, and the fourth lens is a biconvex lens.

12. The optical system according to claim 1, wherein the rear group consists of the cemented lens and the positive lens.

13. The optical system according to claim 1, wherein the positive lens disposed closest to the image side in the rear group includes an aspheric surface having an inflection point in the cross-section including the optical axis.

14. The optical system according to claim 1, wherein the second lens, the third lens, and the positive lens disposed closest to the image side in the rear group are each made of a resin material, and wherein a following conditional expression is satisfied:

$$|f/f3| \leq 0.15$$

where f3 is a focal distance of the third lens, and f is the focal distance of the optical system.

15. The optical system according to claim 1, wherein a following conditional expression is satisfied:

$$1.0 \leq f \times \sin(\theta max)/y(\theta max) \leq 1.9$$

where y(θ) is a projection characteristic of the optical system representing a relationship between a half angle of view θ and an image height, θmax is a maximum half angle of view of the optical system, and f is the focal distance of the optical system.

16. An imaging apparatus comprising:

the optical system according to claim 1; and an image sensor configured to capture an image of an object via the optical system.

17. A system comprising:

the imaging apparatus according to claim 16; and a display apparatus configured to display an image acquired based on an output of the imaging apparatus.

18. The system according to claim 17, wherein the display apparatus comprises a first display unit configured to display a first image corresponding to a first angle of view; and a second display unit configured to display a second image corresponding to a second angle of view including the first angle of view.

19. A movable apparatus comprising:

the imaging apparatus according to claim 16, wherein the movable apparatus is movable while holding the imaging apparatus.

20. An optical system comprising a front group having positive refractive power, an aperture diaphragm, and a rear group having positive refractive power, which are disposed from an object side to an image side in this order, wherein the front group includes a first lens having negative refractive power, a second lens having negative refractive power, a third lens, and a fourth lens having positive refractive power, which are disposed from the object side to the image side in this order, wherein the rear group includes a cemented lens and a positive lens disposed closest to the image side, wherein an object side surface of the second lens is an aspheric surface having an inflection point in a cross-section including the optical axis, wherein a chart representing a curvature of the aspheric surface with respect to radial positions in the cross-section including the optical axis includes a first extremal value and a second extremal value, and wherein a following conditional expression is satisfied:

$$2.4 \leq f23/fa1 \leq 16.0$$

where f23 is a combined focal distance of the second lens and the third lens, and fa1 is a focal distance of an air lens between the second lens and the third lens.

* * * * *